US011539699B2

(12) United States Patent
Kunz et al.

(10) Patent No.: US 11,539,699 B2
(45) Date of Patent: Dec. 27, 2022

(54) NETWORK SLICE AUTHENTICATION

(71) Applicant: Lenovo (Singapore) PTE. LTD., New Tech Park (SG)

(72) Inventors: Andreas Kunz, Ladenburg (DE); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 410 days.

(21) Appl. No.: 16/539,410

(22) Filed: Aug. 13, 2019

(65) Prior Publication Data
US 2020/0053083 A1 Feb. 13, 2020

Related U.S. Application Data

(60) Provisional application No. 62/718,322, filed on Aug. 13, 2018.

(51) Int. Cl.
*H04L 9/40* (2022.01)
*H04W 4/50* (2018.01)
(Continued)

(52) U.S. Cl.
CPC ........ *H04L 63/0892* (2013.01); *H04L 69/329* (2013.01); *H04W 4/50* (2018.02); *H04W 12/06* (2013.01); *H04W 60/00* (2013.01)

(58) Field of Classification Search
CPC .......................... H04L 63/0892; H04W 12/06
See application file for complete search history.

(56) References Cited

U.S. PATENT DOCUMENTS

2019/0029065 A1* 1/2019 Park ...................... H04W 48/02
2019/0223093 A1* 7/2019 Watfa .................... H04W 36/24
(Continued)

FOREIGN PATENT DOCUMENTS

WO 2017173404 A1 10/2017
WO 2017200978 A1 11/2017
WO 2018128529 A1 7/2018

OTHER PUBLICATIONS

3GPP, "3rd Generation Partnership Project; Technical Specification Group Services and System Aspects; Procedures for the 5G System; Stage 2 (Release 15)", 3GPP TS 23.502 V15.2.0, Jun. 2018, pp. 1-308.
(Continued)

*Primary Examiner* — Esther B. Henderson
(74) *Attorney, Agent, or Firm* — Kunzler Bean & Adamson

(57) ABSTRACT

Apparatuses, methods, and systems are disclosed for network slice authentication. One apparatus includes a processor that provides an application layer and a non-access stratum ("NAS") layer and a transceiver for communicating with a mobile communication network. The processor receives, at an application at the application layer, network slice authentication information for a subscribed service and stores the network slice authentication information at an application module. The processor associates the network slice authentication information with single network slice selection assistance information ("S-NSSAI") and registers the application with the NAS layer, said registration pointing to the associated S-NSSAI. Additionally, the transceiver that exchanges, via the NAS layer, authentication messages with an authentication, authorization, and accounting ("AAA") server for network slice authentication information.

22 Claims, 11 Drawing Sheets

(51) Int. Cl.
  *H04L 69/329*  (2022.01)
  *H04W 12/06*  (2021.01)
  *H04W 60/00*  (2009.01)

(56) References Cited

U.S. PATENT DOCUMENTS

2020/0053562 A1* 2/2020 Kim .................. H04W 8/02
2020/0100173 A1* 3/2020 Casati ................ H04W 12/06
2021/0152615 A1* 5/2021 Karampatsis ....... H04L 65/1073

OTHER PUBLICATIONS

3GPP, "3rd Generation Partnership Project; Technical Specification Group Services and System Aspects; Security architecture and procedures for 5G system (Release 15)", 3GPP TS 33.501 V15.1.0, Jun. 2018, pp. 1-152.

3GPP, "3rd Generation Partnership Project; Technical Specification Group Services and System Aspects; Study on user centric identifiers and authentication (Release 16)", 3GPP TR 22.904 V16.0.0, Jun. 2018, pp. 1-20.

3GPP, "3rd Generation Partnership Project; Technical Specification Group Services and System Aspects; System Architecture for the 5G System; Stage 2 (Release 15)", 3GPP TS 23.501 V15.2.0, Jun. 2018, pp. 1-217.

Nokia et al., "Updated SID: Study on Enhancement of Network Slicing", 3GPP TSG SA2#127-bis TD S2-186185, May 28, 2018-Jun. 1, 2018, pp. 1-3.

ISA, Notification of Transmittal of the International Search Report and Written Opinion of the International Search Authority, dated Dec. 16, 2019, pp. 1-15.

Nokia, Slice Specific Authentication SA WG2 Meeting #128, Vilnius, Lithuania dated Jul. 2-6, 2018, pp. 1-6.

Qualcomm Incorporated, Solution for Slice Specific Authentication, SA WG2 Meeting #128, dated Jul. 2-6, 2018, pp. 1-2.

3GPP, Study on Enhancement of Network Slicing, Release 16, TR 23-740 V0.3.0, dated Jul. 2018, pp. 1-22.

Motorola, Application Function Influence on Slice Selection, SA WG2 Meeting #122bis, S2-175862, dated Aug. 21-25, 2017, pp. 1-6.

* cited by examiner

NETWORK SLICE AUTHENTICATION

CROSS-REFERENCE TO RELATED APPLICATIONS

This application claims priority to U.S. Provisional Patent Application No. 62/718,322 entitled "NETWORK SLICE AUTHENTICATION" and filed on Aug. 13, 2018 for Andreas Kunz and Genadi Velev, which is incorporated herein by reference.

FIELD

The subject matter disclosed herein relates generally to wireless communications and more particularly relates to network slice authentication.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Access and Mobility Management Function ("AMF"), Positive-Acknowledgment ("ACK"), Access Stratum ("AS"), Base Station ("BS"), Binary Phase Shift Keying ("BPSK"), Bandwidth Part ("BWP"), Clear Channel Assessment ("CCA"), Cyclic Prefix ("CP"), Cyclical Redundancy Check ("CRC"), Channel State Information ("CSP"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Globally Unique Temporary UE Identifier ("GUTI"), Hybrid Automatic Repeat Request ("HARQ"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Mobility Management Entity ("MME"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), New Generation Node B ("gNB"), New Generation Radio Access Network ("NG-RAN", a RAN used for 5GS networks), New Radio ("NR"), Non-Access Stratum ("NAS"), Non-Orthogonal Multiple Access ("NOMA"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RA", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management Function ("SMF"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

Certain mobile networks may be configured to provide User Identities with related User Identifiers for a user, which are independent of existing identifiers relating to subscription or device (e.g., independent of IMSI, MSISDN, IMPI, IMPU, SUPI, GPSI, IMEI). Here, a User Identifier may be provided by some entity within the operator's network or by a 3rd party. Moreover, the mobile networks may support a mechanism to perform authentication of a User Identity regardless of the user's access, the user's UE and its HPLMN as well as the provider of the User Identifier. When delivering a service, such mobile networks may take into account settings that are specific to a User Identity. Additionally, such mobile networks may support user authentication with User Identifiers from devices that connect via the internet, e.g., they support secure provisioning of credentials to those devices to enable them to access the network and its services according to the subscription that has been linked with the User Identity.

BRIEF SUMMARY

Methods for network slice authentication are disclosed. Apparatuses and systems also perform the functions of the methods.

A first method for network slice authentication includes receiving, at the application at the application layer, network slice authentication information for a subscribed service and storing the network slice authentication information at an application module. The first method includes associating the network slice authentication information with single network slice selection assistance information ("S-NSSAI") and registering the application with the non-access stratum ("NAS") layer, said registration pointing to the associated S-NSSAI. The first method includes exchanging, via the NAS layer, authentication messages with an authentication, authorization, and accounting ("AAA") server for network slice authentication information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
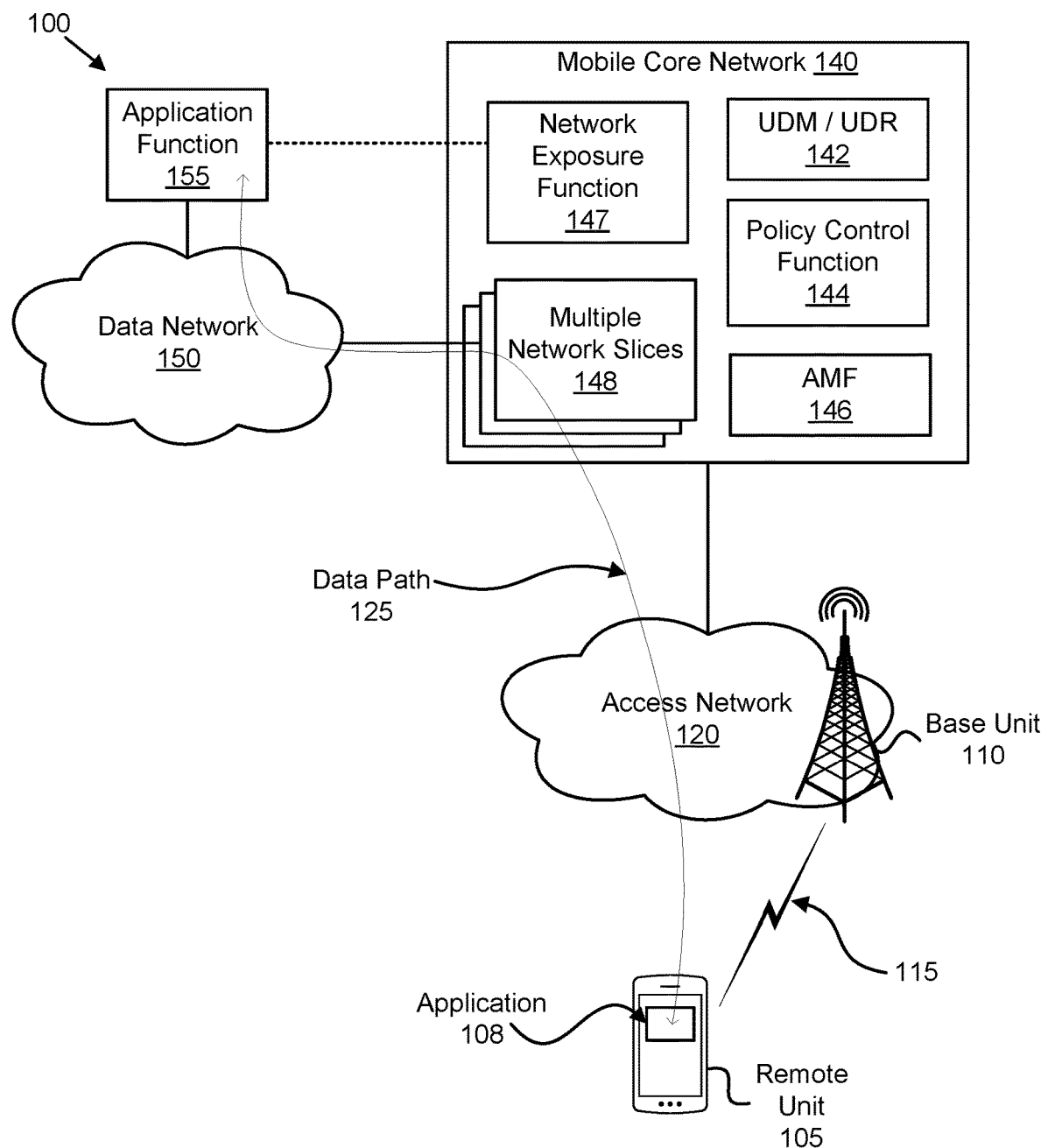
FIG. 1 is a schematic block diagram illustrating one embodiment of a wireless communication system for network slice authentication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses that support authentication and authorization for a particular network slice, e.g., for a service subscribed to by a user. Described herein are mechanism for informing the mobile network and/or the UE of the need for authentication and authorization for a particular network slice. Also described are mechanisms for triggering an authentication/authorization procedure for a network slice. Relatedly, the embodiments described herein show how the UE and the mobile network know which User Identity is to be used for each network slice.

As discussed above, certain mobile networks may be configured to provide User Identities with related User Identifiers for a user, which are independent of existing identifiers relating to subscription or device, and support a mechanism to perform authentication of a User Identity regardless of the user's access, the user's UE and its HPLMN as well as the provider of the User Identifier.

Accordingly, a service may request the mobile network to only authenticate users to the service for which the association of the user with a User Identifier has been established according to specified authentication policies of the service. Thus, the mobile network may support a mechanism to interwork with a 3rd party network entity to authorize the UE to access network slices, based on active User Identifiers at the UE. Such authentication mechanisms are required to protect the privacy of the user by only transferring User Identity information to a service that is necessary to provide the service and for which the user has consented to when registering for the service.

However, it is unclear how the mobile network and/or the UE is aware of the need for authentication and authorization for a particular network slice. Nor is it clear how such an authorization procedure is to be triggered. Relatedly, where the UE uses multiple networks slices, it is unclear how the mobile network knows which User Identity is to be used for each network slice.

According to a first solution, procedures for Service subscription and network slice authentication information provisioning are described for handling the 1) registration (or subscription) to a service and 2) the provisioning of the relevant network slice authentication information to the mobile operator and potentially to the UE from the service provider in order to manage the S-NSSAI for the UE for the service. These subscription and provisioning procedures may be required before network slice authentication can be performed during a UE registration procedure to the MNO.

According to a second solution, a procedure for Slice Authentication during registration may be triggered when the UE registers to the one or more network slices. Here, a network slice authentication procedure is performed for one or more particular S-NSSAI(s) that are marked for authentication within the NAS registration procedure.

According to a third solution, a procedure for Service Provider triggered Un-Subscription may be triggered by the service provider. In response to the trigger, the service provide may initiate the un-subscription at the mobile operator to remove the corresponding S-NSSAI from the subscription data stored at the mobile network.

FIG. 1 depicts a wireless communication system 100 for network slice authentication, according to embodiments of the disclosure. In one embodiment, the wireless communication system 100 includes at least one remote unit 105, an access network 120 containing at least one base unit 110, and a mobile core network 140. The access network 120 and the mobile core network 140 form a mobile communication network. The access network 120 may include a 3GPP access network and/or a non-3GPP access network (e.g., Wi-Fi).

The remote units 105 communicate with the access network 120 using a wireless communication links 115. For example, a remote unit 105 may communicate with a 3GPP access network using 3GPP communication links and may communicate with a non-3GPP access network using non-3GPP communication links. Even though a specific number of remote units 105, access networks 120, base units 110, wireless communication links 115, and mobile core networks 140 are depicted in FIG. 1, one of skill in the art will recognize that any number of remote units 105, access networks 120, base units 110, communication links 115, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the 3GPP access network 120 via uplink ("UL") and downlink ("DL") communication signals. Furthermore, the UL and DL communication signals may be carried over the 3GPP communication links 115. Here, the access networks 120 is an intermediate network that provide the remote units 105 with access to the mobile core network 140.

In some embodiments, the remote units 105 communicate with an application function 155 via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the access network 120 (e.g., a access network 120). The mobile core network 140 then relays traffic between the remote unit 105 and the data network 150 (e.g., to application function 155) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of radio access network are not illustrated but are well known generally by those having ordinary skill in the art. The base units 110 connect to the mobile core network 140 via the access network 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, such as the Internet and private data networks, among other data networks. In some embodiments, the remote units 105 communicate with an application function ("AF") 155 (external to the mobile core network 13) via a network connection with the mobile core network 130. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as describe by the Broadband Forum ("BBF").

The mobile core network 140 includes several network functions ("NFs") and multiple network slices 148. As depicted, the mobile core network 140 includes at least one unified data management with an internal user data repository ("UDM/UDR") 142, at least one policy control function ("PCF") 144, at least one access and mobility management function ("AMF") 146, and at least one network exposure function ("NEF") 147. Although a specific number of NFs are depicted in FIG. 1, one of skill in the art will recognize that any number of NFs may be included in the mobile core network 140. In certain embodiments, each of the multiple network slices 148 includes its own dedicated network functions (not shown), such as a session management function ("SMF") and user plane function ("UPF"). While the depicted embodiment shows a single AMF 146 in the mobile core network 140, in other embodiments each of the multiple network slices 148 may implement its own AMF.

The UDM/UDR 142 comprises a Unified Data Management ("UDM") and its internal component User Data Repository ("UDR"). The UDR holds subscription data including policy data. Specifically, the policy data stored by the UDM/UDR 142 includes the NSSP. The UDM/UDR 142, PCF 144, AMF 146, and SMF (not shown) are examples of control plane network functions of the mobile core network 140. Control plane network functions provide services such as UE registration, UE connection management, UE mobility management, session management, and the like. In contrast, a user plane function (UPF) provides data transport services to the remote units 105.

The NEF 147 implements a "front end" service that interfaces with external application functions and exposes to these functions the capabilities of the mobile core network. For example, the NEF 147 can be used by an AF 155 to communicate with the UDM/UDR 142, for example to provision network slice authentication information as described herein. Thus, the NEF provides a single point of contact for external applications that want to utilize the services offered by the internal network functions of the mobile network (e.g., services of the AMF 146, PCF 144, UDM 142, SMF, etc.). In certain embodiments, the mobile core network 140 may also include an Authentication Server Function ("AUSF"), a Network Repository Function ("NRF") (used by the various NFs to discover and communicate with each other over APIs), or other NFs defined for the 5GC.

The multiple network slices 148 are logical networks within the mobile core network 140. The network slices 148 are partitions of resources and/or services of the mobile core network 140. Different network slices 148 may be used to meet different service needs (e.g., latency, reliability, and capacity). Examples of different types of network slices 148 include enhanced mobile broadband ("eMBB"), massive machine-type communication ("mMTC"), and ultra-reliability and low latency communications ("URLLC"). A mobile core network 140 may include multiple network slice instances of the same network slice type. Different network slice instance of the same type may be distinguished by a slice "tenant" (also known as "slice differentiator") associated with the instance.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

As discussed above, a mobile application 108 running on the remote unit 105 communicates with the AF 155 via the data path 125 that passes through a network slice 148 of the mobile core network. Additionally, the AF 155 may send information to the mobile core network 140 which can be used to optimize the network internal configuration or network behavior. In certain embodiments, the AF 155 is an application server ("AS") or a service capability server ("SCS") enabling a mobile application 108 to access and use functionality provided by the server over standardized interfaces (e.g., APIs).

The wireless communication system 100 is capable of authenticating users to a network slice, specifically providing network slice access authentication and authorization using user identities and credentials different from the 3GPP SUPI, as described above. Such a network slice access authentication is distinct from secondary authentication of the PDU session (e.g., the triggering of another authentication at a later stage when the UE is requesting PDU session set up for conductivity). While secondary authentication for a PDU session is performed during the PDU establishment procedure, network slice authentication is performed during the registration procedure. Moreover, while secondary authentication for PDU session involves the SMF, the network slice authentication described herein does not involve the SMF.

In order to support network slice authentication, and address the above noted deficiencies in the current network deployments, the following procedures are disclosed:

First, Service subscription and network slice authentication information provisioning: handles the 1) registration (or subscription) to a service and 2) the provisioning of the relevant network slice authentication information to the mobile operator and potentially to the UE from the service provider in order to manage the S-NSSAI for the UE for the service. These procedures are required before network slice authentication can be performed during a UE registration procedure to the MNO.

Second, Slice Authentication during registration procedure: triggers network slice authentication for a particular S-NSSAI(s) that are marked for authentication within the NAS registration procedure when the UE registers to the one or more network slices.

Third, Service Provider triggered Unsubscription: after a trigger fired at the service provider, it can initiate the unsubscription at the mobile operator to remove the corresponding S-NSSAI from the subscription data.

Figure 2A:
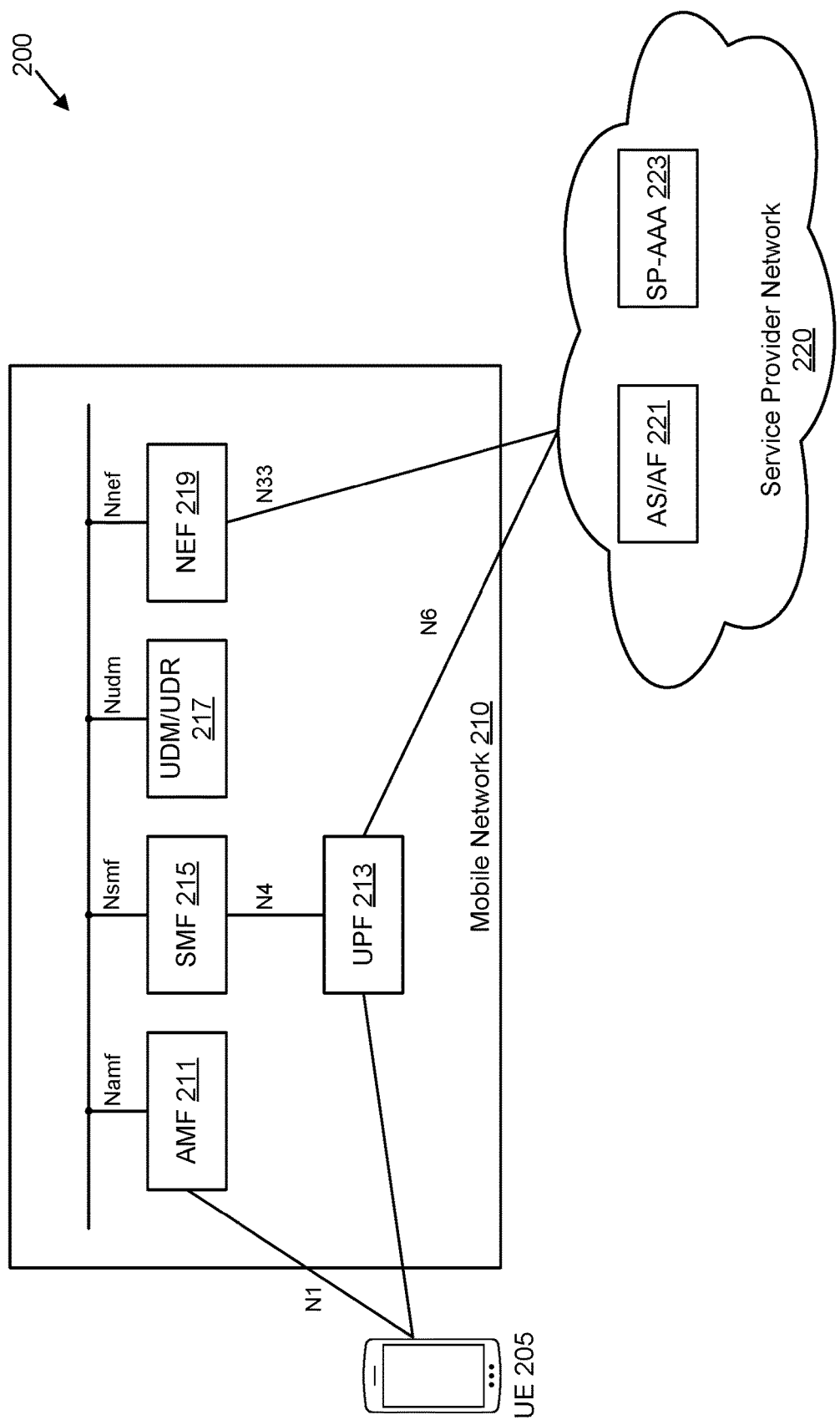
FIG. 2A is a diagram illustrating one embodiment of a network architecture for network slice authentication.

FIG. 2A depicts a network architecture 200 for network slice authentication, according to various embodiments of the disclosure. The network architecture 200 may be an applied embodiment of the wireless communication system 100. The network architecture 200 depicts a UE 205 in communication with an AMF 211 in a mobile network 210 (e.g., via N1 interface/reference-point). The mobile network 210 includes the AMF 211, a UPF 213, an SMF 215, a UDM/UDR 217, and NEF 219. The UE 205 uses the mobile network 210 to access a service in the service provider network 220. Depicted within the service provider network 220 are an application server/application function ("AS/AF") 221 and a service provider AAA ("SP-AAA") server 223. The AMF 211, UDM/UDR 317, NEF 319, and AS/AF 221 may be embodiments of the AMF 136, UDM/UDR 132, NEF 137, and application function 155, respectively, as described above with reference to FIG. 1.

As shown in FIG. 2A, it can be assumed that a service provider (implying an application server (AS) or application function (AF) and a particular AAA server) located outside the mobile network 210 is communicating with the UDM/UDR 217, e.g., via the NEF 219. Note that the AAA server may be located in or outside the MNO domain. In some embodiments, if the service provider is located inside the mobile network 210 then the AS/AF 221 and SP-AAA 223 may directly communicate with the UDM/UDR 217. The UDM/UDR 217 performs a binding of the UE subscription to the User IDs as well as the subscribed service with information about the service provider. As used herein, the User ID uniquely identifies a registration/subscription of the user for a particular service at a service provider. Note that the UE 205 also stores an association between S-NSSAI and corresponding credentials for network slice authentication, as discussed in further detail below. For example, the UE 205 may store network slice information (e.g., including the User ID and security credentials) at an application module (e.g., located in the Application Layer).

Figure 2B:
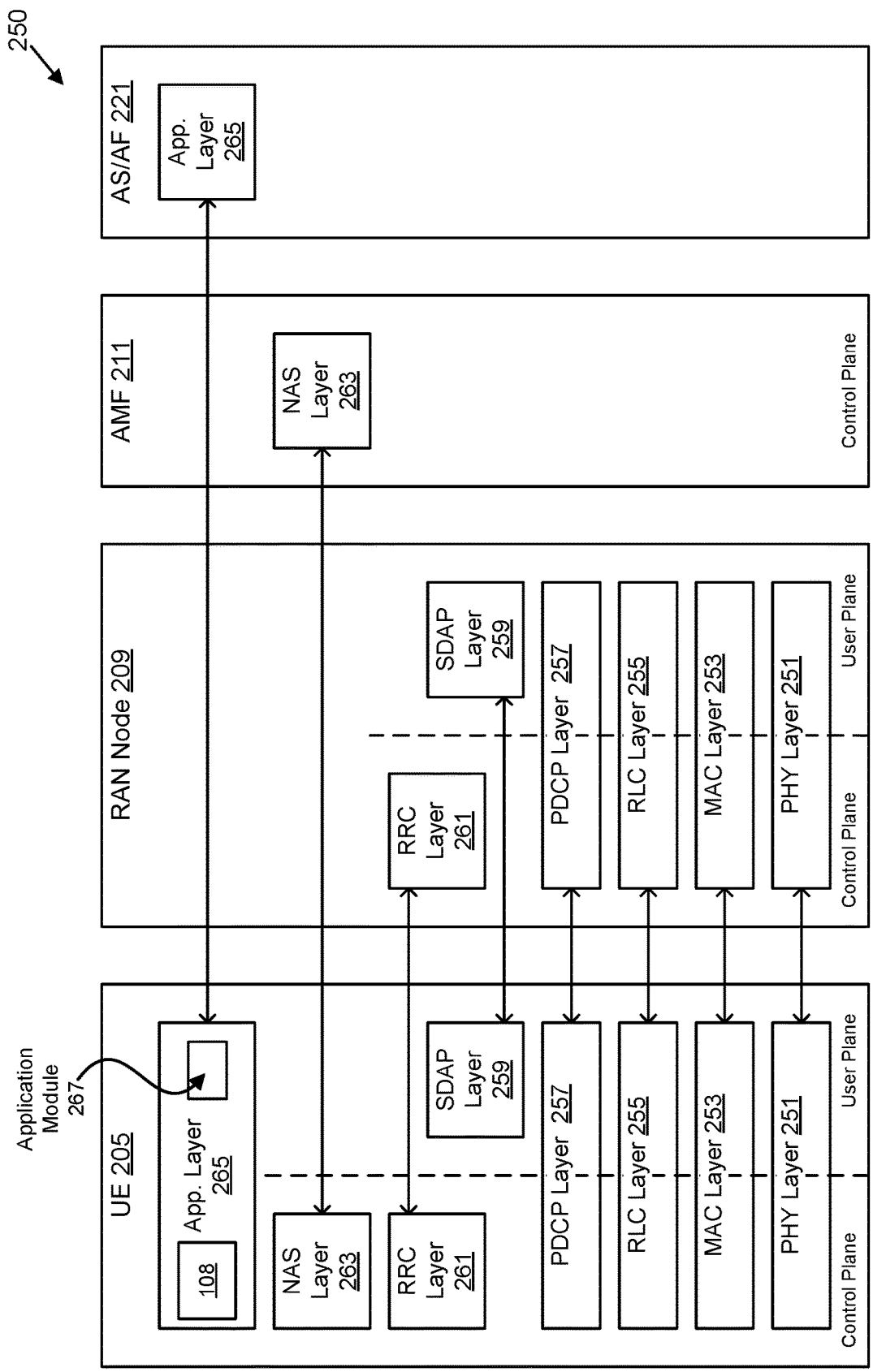
FIG. 2B is a diagram illustrating one embodiment of protocol layers for network slice authentication.

FIG. 2B depicts a protocol layer architecture 250, according to various embodiments of the disclosure. The protocol layer architecture 250 depicts various protocol stacks in the UE 205, a RAN node 209 (e.g., a gNB), the AMF 211, and the AS/AF 221. Note that the RAN node 209 may be one embodiment of the base unit 110 described above.

The UE 205 includes a physical layer ("PHY Layer") 251 and a corresponding PHY Layer 251 is present in the RAN node 209. The PHY Layer 251 corresponds to the L1 layer, e.g., of the OSI model. The UE 205 includes a Medium Access Control layer ("MAC Layer") 253 and a corresponding MAC Layer 253 is present in the RAN node 209. The UE 205 includes a Radio Link Control layer ("RLC Layer") 255 and a corresponding RLC Layer 255 is present in the RAN node 209. The UE 205 includes a Packet Data Convergence Protocol layer ("PDCP Layer") 257 and a corresponding PDCP Layer 257 is present in the RAN node 209. In 5G NR, the UE includes a Service Data Adaptation Protocol layer ("SDAP Layer") 259, used for mapping QoS flows to data radio bearers and marking QoS flow IDs in DL and UL packets. The SDAP Layer 259, PDCP Layer 257, RLC Layer 255, MAC Layer 253 and PHY Layer 251 correspond to the L2 layer. Note that the PDCP Layer 257, RLC Layer 255, MAC Layer 253 and PHY Layer 251 operate in both the control plane and user plane, while the SDAP Layer 259 is only a part of the user plane protocol stack.

The UE 205 includes a Radio Resources Control layer ("RRC Layer") 261 and a corresponding RRC Layer 261 is present in the RAN node 209. The UE 205 includes a Non-Access Stratum layer ("NAS Layer") 263 and a corresponding NAS Layer 263 is present in the AMF 211. Note that the RRC Layer 261 and NAS Layer 263 are part of the control plane protocol stack. The RRC Layer 261 and NAS Layer 263 belong to the L3 layer.

Additionally, the UE 205 includes an Application Layer 265 and a corresponding Application Layer 265 is present in the AS/AF 221. The mobile application 108 described above operates in the application layer 265. Network slice authentication information may be stored, e.g., in an application module, at the Application Layer 265 of the UE 205. During a network slice authentication procedure, authentication messages encapsulated within NAS messages are exchanged between the NAS layer 263 of the UE 205 and the SP-AAA 223. One or more mobile applications 108 may be registered at the NAS layer 263, so that the NAS layer 263 is able to forward the authentication messages to the appropriate mobile application 108. NAS layer registration of applications is discussed in further detail below.

Additionally, there may be one or more Application Modules 267 at the application layer 265. The application module 267 may be an EAP client in the UE 205. The EAP client may store different authentication information per S-NSSAI. The EAP client may a different application than the application 108 which sends/receives the real data. Note that it is the application 108 that is identified in the NSSP rules.

For example, the mobile application 108 may be a media streaming client application, e.g., providing a video streaming service to subscribers. Via the application 108, the User may access server(s) of the video streaming service provider to subscribe and receive network slice authentication information. In some embodiments, the network slice authentication information is stored at the application 108. For example, the application 108 may include a software module where the network slice authentication information is to be stored. In other embodiments, the network slice authentication information is stored at an application module 267 that is different than the application 108. As discussed above, the application module 267 may be an EAP client that is a different application than the media streaming client (application 108). Here, the application module 267 performs authentication with the SP-AAA 223, while the media streaming client (application 108) sends/receives data from the AS/AF 221.

Figure 3:
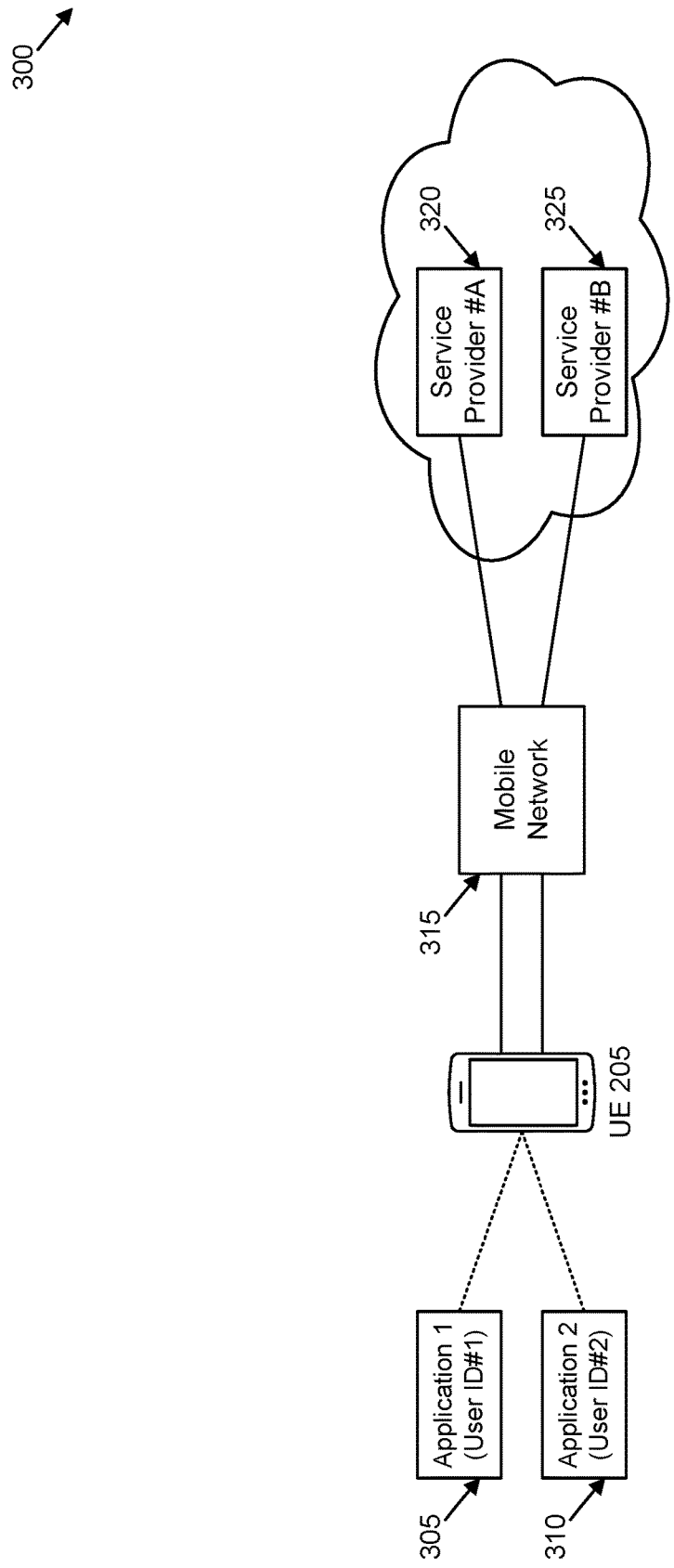
FIG. 3 is a diagram illustrating one embodiment of a service architecture for network slice authentication.

FIG. 3 depicts a service architecture 300 illustrating relationships between different services in the UE 205 and service providers. The service architecture 300 may be based on the wireless communication system 100 and/or network architecture 200. The service architecture 300 includes a UE 205 having a first application 305 and second application 310. As depicted, the first application 305 is associated with a first user ID (UserID #1) while the second application 310 is associated with a second user ID (UserID #2). Via the mobile network 315 (e.g., embodied by the access network 120 and mobile core network 130) the UE 205 is able to access to a first service provider (Service Provider #A) 320 and a second service provider (Service Provider #B) 325.

The service architecture 300 shows the relationship between the different services in the UE 205 and the service providers. The UE 205 has a subscription to the mobile network 315 and can register to the mobile network 315 in order to access the mobile operator services, e.g., internet access, IMS etc. A user is using the UE 205.

The User uses his/her UE 205 for different services offered by Service Providers, e.g., using different applications installed on the UE 205. The UE 205 has a subscription with a mobile network 315 to get connectivity service(s) (e.g., IP connectivity and/or Ethernet connectivity). The mobile network operator can interact with one or more Service Providers (SPs). For using some services (or applications) the User may use different IDs (or User IDs). As depicted, the first application 305 uses User ID #1 to access services offered by Service Provider #A; and the second application 310 uses User ID #2 to access services offered by Service Provider #B.

The user registers (or subscribes) to a service offered by the service provider #A with a User ID #1. This User ID #1 may be specific to the service provider and may not be related to any identities used in the mobile network 315 by the mobile network operator. The User may register (or subscribe) to a different service offered by service provider

B with user ID #2. The service providers configure the subscription of User IDs and her subscribed service with the mobile operator. As used herein, a Service ID uniquely identifies a subscribed service at a SP-AS. As used herein a service description describes the service and the communication pattern for a Service ID. "SP-AS" refers to an Application Server that is hosting the subscribed service identified with the Service ID. The SP-AS may be co-located with the AAA-Server for authentication. The AAA Server ID uniquely identifies the AAA for authentication, e.g., in NAI or URL format.

In some embodiments, the User ID may be a GPSI ("Generic Public Subscription Identifier," e.g., a UE external ID or MSISDN). The GPSI identifies uniquely a subscription of the UE 205 in the mobile operator (e.g., in UDM/UDR or HSS). Note that a UE 205 may have multiple external ID or GPSIs, so that these IDs can be used as User IDs for different services. As such, the first application 305 may be associated with a first GPSI and the second application 310 may be associated with a second GPSI.

The different user services (e.g., the application with User ID #1 and the application with User ID #2) can be mapped to the same or different network slices 138. The UE 205 is configured with network slice information, e.g., configured with Network Slice Selection Policy (NSSP) as part of the UE Route Selection Policy (URSP) policies. Having this, the UE 205 may determine that an Application x with particular User ID-x is associated with the S-NSSAI-x from the NSSP rules.

Figure 4:
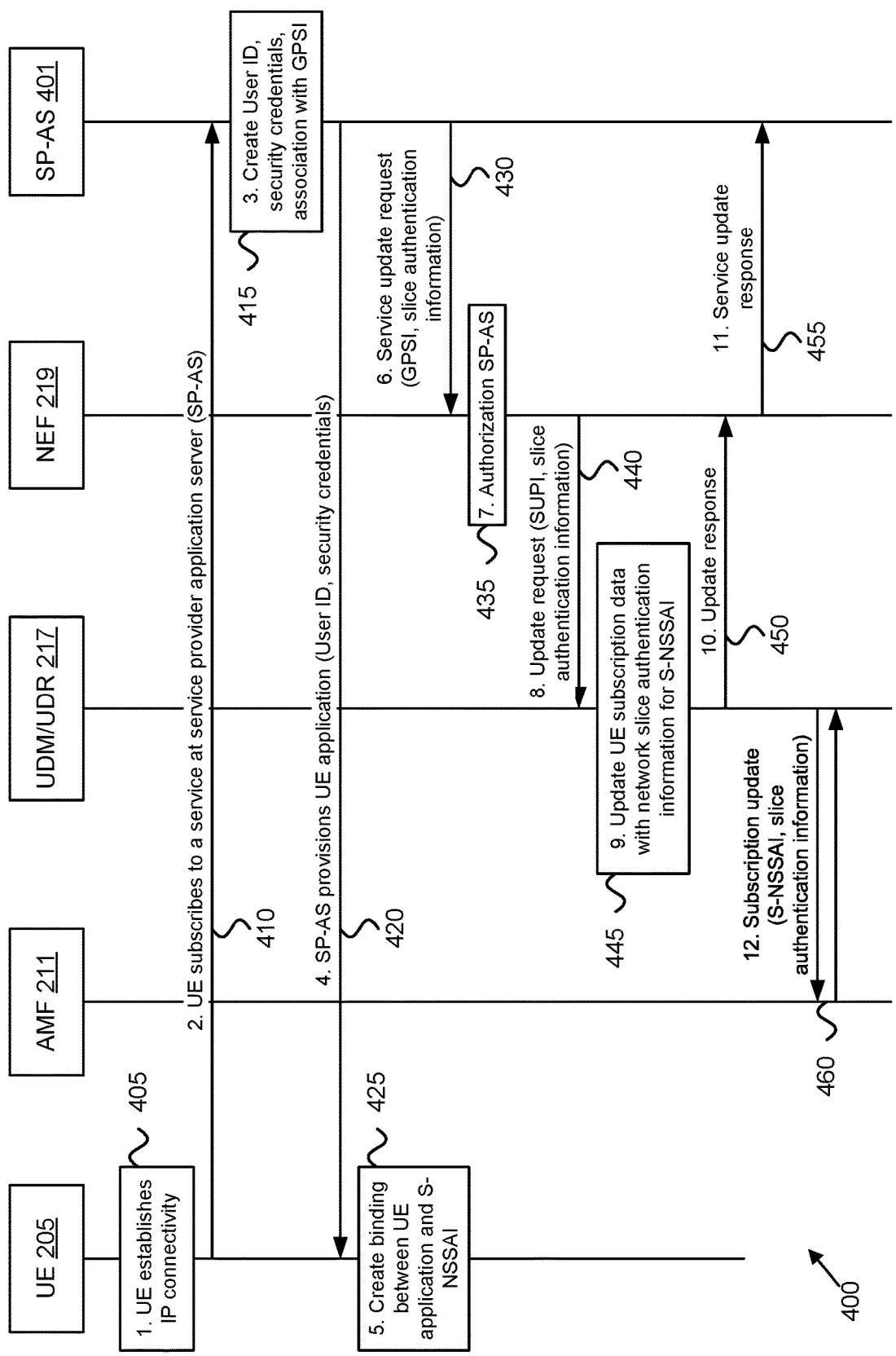
FIG. 4 is a diagram illustrating one embodiment of a network procedure for service subscription and authentication information provisioning.

FIG. 4 depicts a first network procedure 400 illustrating signaling flows for service subscription and provisioning of network slice authentication information in a mobile network, according to embodiments of the disclosure. The first solution may be implemented by the depicted signaling flows.

The first network procedure 400 involves the UE 205, the AMF 211, the UDM/UDR 217, the NEF 219, and an SP-AS 401. The SP-AS 401 may be one embodiment of the AS/AF 221. According to embodiments of the first solution, the SP-AS 401 (e.g., referring to the application function (AF) or application server (AS) of the service provider) provisions the network (e.g., the UDM/UDR 217 within the core network) with information related to the service requirements or service configuration data of the UE 205. For example, the service requirement may be that the UE 205 first needs to be authenticated and/or authorized by the service provider before network resources are assigned to this UE 205. The service provider may be aware that a particular network slice 138 is assigned for this service (e.g., based on the service level agreements between the MNO and the service provider). The mobile network uses the information from the SP-AS 401 to determine whether network slice authentication and authorization is needed, and which parameters are used for it.

As used herein, the information sent from the SP-AS 401 to the network is referred as "network slice authentication information." In various embodiments, the network slice authentication information may be stored at the UDM/UDR 217 and signaled to the serving AMF 211 together with the UE subscription data. However, in other embodiments the network slice authentication information may be stored at another location in the mobile network.

The network slice authentication information may include one or more of the following elements: An indication (or flag) whether authentication and authorization (e.g., network slice authentication) is required. Such indication can for example has a binary value of 'activate' or 'deactivate' (or 'true' or 'false'); A User ID (to be used during the network slice authentication and authorization between the UE and service provider AAA server). The User ID can be a specific application user ID having a type of NAI or a kind of GPSI; A Service ID and/or service description (which helps to the MNO to identify which network slice to use for the service data); and/or An AAA server ID (identifying the target server performing the authentication and authorization for a particular network slice, or a service).

Note that the first network procedure 400 includes two different sub-procedures: 1) a service registration (or subscription) procedure used to establish an association between the UE 205 and the SP-AS 401 comprising steps 1-5; and 2) an information provisioning procedure which is needed for the network slice authentication and/or authentication in the network comprising steps 6-12. A detailed description of these steps is provided as follows:

At step 1, the UE 205, having a subscription with the mobile operator as a precondition, registers in the mobile network and establishes IP conductivity (see block 405).

At step 2, the UE 205 registers (or subscribes) to a Service Provider's service (see messaging 410). For example, the user may use the web interface of the Service Provider Application Server (SP-AS) 401 to register to a particular service. Alternatively, the user may use an Application on the UE 205 to register to the particular service. Registering to the particular service creates a User ID for this service and a GPSI for identifying the UE's subscription in the UDM/UDR 217. As noted above, the GPSI may function as a User ID for the service.

In various embodiments, the authentication method (e.g., username/password, certificates, SIM card, credentials of the mobile operator etc.) is negotiated between the UE 205 and the SP-AS 401 during step 2-4. Moreover, the mobile network operator ("MNO") and the SP-AS 401 may execute additional signaling exchange to negotiate service level agreement (SLA). During such SLA exchange, the MNO and the SP-AS can negotiate e.g., a GPSI and/or a need for network slice authentication if a specific network slice has to be used for the SP-AS 401 services.

At step 3, the SP-AS 401 creates a subscription for the service and stores the User ID and the security credentials (see block 415). In various embodiments, the SP-AS 401 may configure a validity time for the subscription. In addition, the SP-AS 401 may create an association between the SLA with a particular MNO and possible Generic Public Subscription Identifier ("GPSI" or also known as "UE external ID") with the registration (e.g., associated with the User ID) as performed in step 2.

At step 4, the SP-AS 401 exchanges messages with the UE 205 on the application layer to provide the User ID, Service ID, and security information e.g., authentication method and credentials for authentication (see messaging 420). The session used to create the subscription may be secured by TLS or other transport layer security protocols. While steps 2 and 4 are shown with a single arrow each, note that multiple exchanges between the UE 205 and the SP-AS 401 may occur during these steps.

At step 5, the UE 205 stores the User ID, security information (e.g., security credentials) and the Service ID pointing to the subscribed service at the SP-AS 401 (see block 425). This information may be stored at the Application level (e.g., application layer 265). In various embodiments, the application registers with the NAS layer 263 to inform the NAS about the stored network slice authentication information. This application registration at the NAS layer 263 is needed in order to know which application should be contacted when the NAS layer 263 receives an authentication request for the particular S-NSSAI.

Based on the NSSP rules provisioned in the UE 205 within the URSP policies, the UE 205 can deduce that the particular service/application (having the particular User ID and security information) is associated with a particular S-NSSAI according to the NSSP rules. In certain embodiments, the application checks the NSSP rules to determine the associated S-NSSAI. Then the application can register with the NAS layer 263 about the available network slice authentication information and pointing to the associated S-NSSAI. As such, the UE 205 stores an association between S-NSSAI and corresponding credentials for network slice authentication.

The UE 205 may store the provisioned User ID and security information in such a way that the NAS layer 263 (e.g., particularly the mobility management processing part of the NAS layer in the UE 205) is able to forward authentication/authorization messages to the particular application or storage (e.g., application module) where the security information is stored. In some embodiments, the NAS layer 263 forwards authentication/authorization messages based on the S-NSSAI. In some embodiments, the NAS layer 263 forwards authentication/authorization messages based on the User ID. If NSSP rules are not available, the application in the UE 205 may register with the NAS layer 263 without pointing to a particular S-NSSAI.

The information provisioning procedure 410 comprises steps 6-12. At step 6, assuming the SP-AS is external to the mobile network, the SP-AS 401 may use a network service exposed by the MNO via a NEF 219 in order to provide the network slice authentication information to the MNO (see messaging 430). For example, the SP-AS 401 can use an existing service like Nnef_ParameterProvision_Update request message offered by the NEF 219 in order to provision subscription information. Alternatively, a new API with a new service may be specified for the purpose of network slice authentication information provisioning by the SP-AS 401. In FIG. 4, this message is referred as Service Update Request message (or another type of request for provisioning or updating the UE Subscription Data) and it contains at least the GPSI (which identifies the UE 205) and the Transaction Reference ID (which identifies the transaction request between NEF 219 and SP-AS 401). Additionally, this Service Update Request message includes network slice related information, which in this case is shown as 'network slice authentication information'.

The network slice authentication information may contain one or more of the following elements: an indication for network slice authentication required, User ID, Service ID, Service Description and AAA Server ID. Please note that the AAA server ID is optional. If the User ID is compliant with the NAI format (i.e., according to IETF RFC 7542, e.g., user@realm), then the AAA server ID can be derived from the realm or domain name of the NAI. The SP-AS 401 may also provide a Re-Authentication time interval for enforcement of network slice authentication, e.g., causing the AMF 211 to trigger slice re-authentication after the time interval expires.

At step 7, the NEF 219 performs authorization of the request message from the service provider (see block 435). At step 8, the NEF 219 sends an Update Request to the UDM/UDR 217, which for example can be Nudm_ParameterProvision_Update request message or Nudr_DM_Update request message (see messaging 440). This Update Request message may contain at least GPSI, SP-AS ID, Transaction Reference ID(s) and in addition information provided by the SP-AS 401. For example, the additional information from SP-AS 401 may include network slice authentication information, e.g., indication for network slice authentication required, User ID, Service ID, Service Description, and (optionally) AAA Server ID and Re-Authentication time interval.

At step 9, the UDM/UDR 217 maps the update request from the NEF 219 to a particular UE Subscription Data (or UE specific policy data, see block 445). The UDM/UDR 217 may use the Service Description and Service ID to identify to which S-NSSAI from the Subscribed S-NSSAIs shall be used to associate the network slice authentication information with. Based on the updated request from the NEF 219, the UDM/UDR 217 may also add a new S-NSSAI to the Subscribed S-NSSAIs in the subscription data. In certain embodiments, the UDM/UDR 217 may further update the subscription data with Service ID, Service Description, AAA Server ID, User ID and potentially Re-Authentication Time Interval.

Additionally, the UDM/UDR 217 may update the Access and Mobility Subscription data related to particular S-NSSAI. For example, a new field or parameter may be added including one or more parameters of the network slice authentication information.

At step 10, the UDM/UDR 217 sends an Update Response to the NEF 219, indicating that the Subscription has been updated (see messaging 450). For example, this message can be a Nudm_ParameterProvision_Update Response message or a Nudr_DM_Update response message. If the procedure failed, the Update Response includes a cause value indicating the reason.

At step 11, the NEF 219 replies to the request from step 6, e.g., the NEF 219 sends a Service Update Acknowledgment message to the SP-AS 401 (see messaging 455). For example, the NEF 219 may send a Nnef_ParameterProvision_Update response message.

At step 12, if there is a serving AMF 211 for the UE 205 registered at the UDM/UDR 217, then the UDM/UDR 217 updates the serving AMF 211 with the updated subscription data (see messaging 460). For example, the UDM/UDR 217 may send a Nudm_SDM_Notification Notify message including a new Subscribed S-NSSAI and/or the network slice authentication information associated with a particular S-NSSAI. The network slice authentication information associated with a particular S-NSSAI may contain at least of the following elements: indication for network slice authentication required, AAA Server ID, User ID and potentially Re-Authentication Time Interval.

If the Registration procedure is ongoing, the AMF 211 may initiate network slice authentication procedure for this S-NSSAI by contacting the AAA Server, described in further detail below with reference to FIG. 5. If the updated subscription data is sent when the UE 205 is already registered with the network and the associated S-NSSAI is already included in the Allowed NSSAI sent to the UE 205, then the AMF 211 may establish a NAS signaling connection to the UE 205 (e.g., if the UE 205 is in Idle state, the AMF 211 should page the UE 205) and the AMF 211 initiates the network slice authentication with the AAA serve, described in further detail below with reference to FIG. 5.

A benefit of this first solution is that the UE 205 is not required to maintain information as to whether network slice authentication and/or authorization is needed (e.g., whether it is activated or deactivated). Rather, such configuration is performed in the network, more specifically in the UE Subscription Data. The service provider (e.g., SP-AS 401) may ensure the alignment of configuring the UE 205 (as per steps 4 and 5 in FIG. 4) and configuring the network (e.g., the UDM/UDR 217 as per steps 6 to 11 in FIG. 4) with information needed for the network slice authentication and/or authorization. This can be referred as network-based solution.

In one alternative implementation of the first solution, instead provisioning the network slice authentication information to the network via NEF 219 and network exposed services, the network slice authentication information can be inserted in the UDM/UDR 217 during service level agreement negotiations between the MNO and the service provider. As such, the network slice authentication information may be preconfigured in the UDM/UDR 217 prior to the UE 205 accessing the service.

In an alternative implementation of steps 1 to 5 in FIG. 4, the service/application related information provisioned in the UE 205 (e.g., User ID, security information and the Service ID) may be sent to the UE 205 via over-the-air (OTA, e.g., Open Mobile Alliance (OMA) Device Management (DM) protocols) mechanisms from the network operator. With other words, the UE 205 may be provisioned with information related to network slice authentication and authorization from the network operator.

In such embodiments, the network operator obtains the information to be provisioned to the UE 205 from the service provider (e.g., SP-AS 401). One possibility is that the SP-AS 401 sends the UE-related information for provisioning during steps 6-11 in FIG. 4, e.g., as additional information to the service-related information to be provisioned in the network (e.g., the network slice authentication information for provisioning in the UDM/UDR). In this case, the SP-AS 401 would send to the NEF 219: 1) UE-specific network slice authentication information (to be provisioned in the UE) and 2) network-specific network slice authentication information (to be provisioned in the network, refer to step 6 in FIG. 4). Another possibility is that the UE-related information can be inserted in the UDM/UDR 217 during service level agreement negotiations between the MNO and the service provider.

Figure 5:
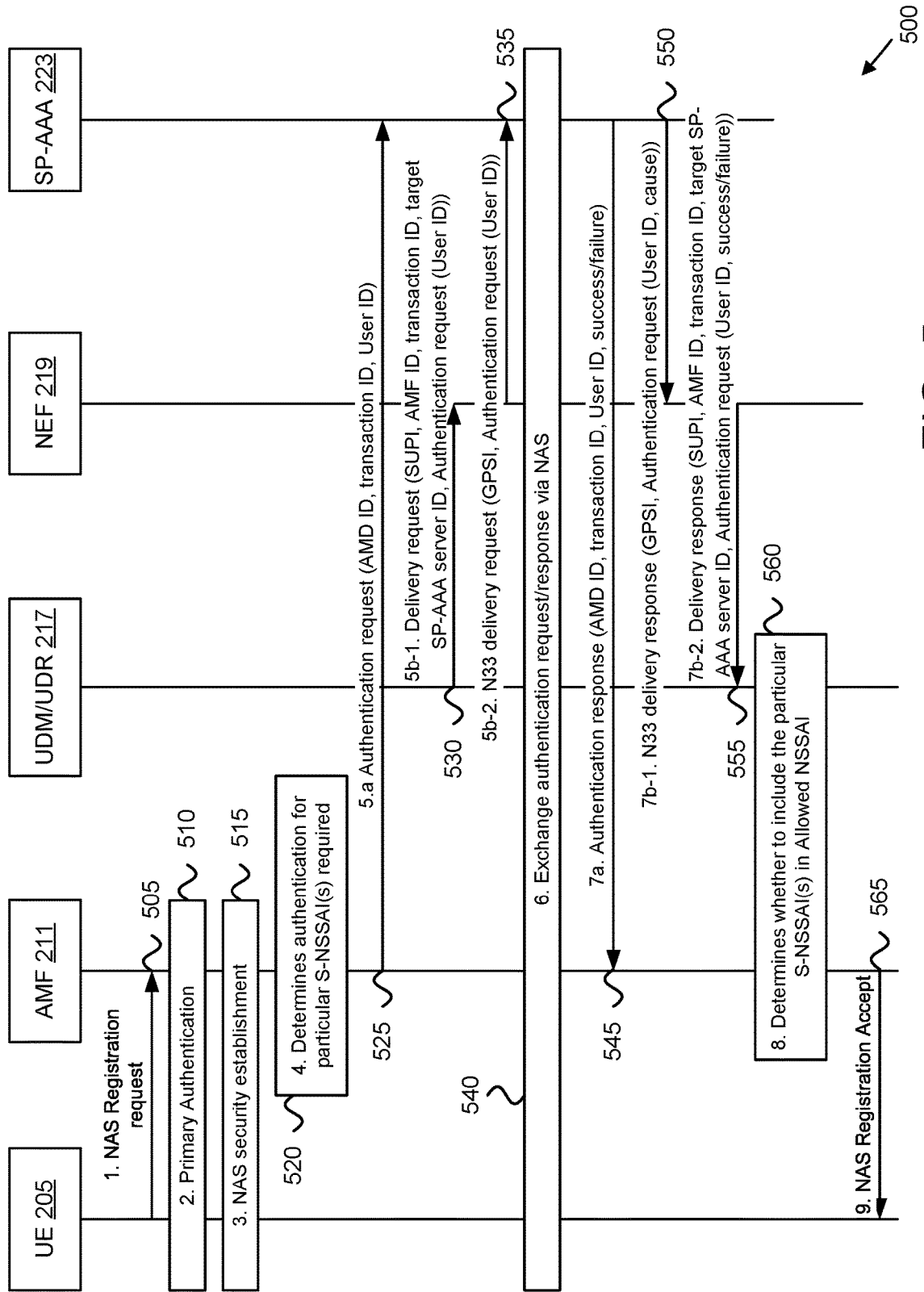
FIG. 5 is a diagram illustrating one embodiment of a network procedure for network slice authentication.

FIG. 5 depicts a second network procedure 500 for network slice authentication during NAS registration procedure, according to embodiments of the disclosure. The second network procedure 500 involves the UE 205, the AMF 211, the UDM/UDR 217, the NEF 219, and the SP AAA 230. FIG. 5 shows signaling flows for NAS registration procedure and enhancements needed for additional network slice authentication. A detailed description of the steps in FIG. 5 is provided as follows:

At step 1, the UE 205 sends a NAS registration request message to the AMF 211 via the radio access network, the NAS registration message including the Requested NSSAI (see messaging 505). At step 2, the AMF 211 retrieves the UE 205 context (if existing in the core network) or retrieves the subscription data of the UE 205 ("UE Subscription Data") from the UDM/UDR 217. The AMF 211 performs network access authentication and authorization with the UE 205, which is referred as primary authentication (see block 510). At step 3, the AMF 211 sets up NAS and AS security contexts for the UE 205 (see block 515).

At step 4, the AMF 211 determines based on the UE Subscription Data (or UE Context) that network slice authentication is required for one or more of the Requested S-NSSAI(s) (see block 520). The AMF 211 may use the network slice authentication information from the UE Subscription Data per S-NSSAI, which may have an indication that network slice authentication is required. Such an S-NSSAI (requiring network slice authentication) is associated at least with one of corresponding User ID, SP-AAA Server ID and potentially Re-Authentication Time Interval.

At step 5, the AMF 211 sends a request for delivery of the Authentication Request for the S-NSSAI that requires slice authentication to the AAA Server (e.g., SP-AAA 223) based on the AAA Server ID. The Authentication Request contains one or more of the following parameters GPSI, User ID, and AAA Server ID. Please note that the SP-AAA server ID may be identical with the SP-AS ID as per FIG. 4. Note that there are several options on sending the message from the AMF 211 to the SP-AAA Server 223:

Option A, the AAA server (e.g., SP-AAA Server 223) belongs to the mobile operator network (e.g., the SP-AAA server 223 is located within the mobile communication network); thus, the AMF 211 generates the Authentication Request message and sends it directly to the AAA server (see messaging 525). This is shown as step 5a in the FIG. 5. The underlying protocol for the direct communication may be TLS, HTTP, IP, TCP, UDP, Diameter, Radius, GTP etc. The AMF 211 would be in the path of all following messages during the authentication procedure between UE 205 and SP-AAA Server 223 (step 6), the number of messages depend on the authentication method.

Option B, the NEF 219 is involved on the delivery path between AMF 211 and SP-AAA Server 223. This is shown as step 5b in the FIG. 5. Step 5b-1 shows the message between AMF 211 and NEF 219 and step 5b-2 shows the message between NEF 219 and SP-AAA Server 223. The AMF 211 sends a Delivery request message to the NEF 219 including at least one of UE's SUPI, AMF ID, transaction ID, target SP-AAA server ID, and the Authentication Request message to the SP-AAA Server 223 (see messaging 530). The NEF 219 can be used independently whether the AAA server (e.g., SP-AAA Server 223) belongs to the mobile network or is located outside the mobile network (e.g., at third party service provider). The NEF 219 may offer a new NF service for network slice authentication messages delivery from/to the AMF 211 (or another network function ("NF")). The NEF 219 can translate the SUPI to GPSI and use the AAA Server ID in order to identify (at the NEF 219) a SP-AAA Server 223 and to refer to a particular UE 205 (see messaging 535). The NEF 219 may use a new API towards the SP-AS 401 to exchange the authentication/authorization messages. The NEF 219 and the AMF 211 would be then also in the path of all following messages during the authentication procedure between UE 205 and SP-AAA Server 223 (step 6), the number of messages depend on the authentication method.

Option C, the AMF 211 sends the Authentication Request message via a proxy AAA server which is part of the AMF's PLMN. Such a proxy AAA server can also serve as an AAA interworking function. The AMF 211 and the proxy AAA would be in the path of all following messages during the authentication procedure between UE 205 and SP-AAA Server 223 (step 6), the number of messages depend on the authentication method.

Note that the Authentication Request may be sent after timeout of the Re-Authentication time interval, if available, as long as the UE 205 is registered to the network.

At step 6, the UE 205 and the SP-AAA Server 223 exchange the messages for network slice authentication and authorization (see block 540). The SP-AAA Server 223 uniquely identifies the request from the AMF 211 based on the User ID. The messages for network slice authentication and authorization are exchanged via the AMF 211, i.e., on the path between UE 205 and AMF 211, the mobile terminated (MT) and mobile originated (MO) authentication messages are encapsulated in a NAS protocol message payload (e.g., N1 MM NAS transport message can be used). On the path between AMF 211 the SP-AAA Server 223, the MT and MO authentication messages traverse the same path as in step 5 (either directly or via NEF 219 or via a AAA proxy server). The number of messages depend on the authentication method. It could be a simple password, or challenge/response based authentication and/or authorization mechanism etc.

The SP-AAA Server 223 uses the User ID in the authentication/challenge request message, so that the UE 205 can associate the authentication/challenge request with the credentials stored in the UE 205. In the downlink, the AMF 211 may include in the NAS message header the S-NSSAI associated with the ongoing network slice authentication procedure. When the UE 205 receives the NAS message and extracts the encapsulated authentication message, the UE 205 may determine based on the S-NSSAI to which application/service (e.g., software module) to forward the authentication message.

Note that in case of multiple network slice authentication procedures running in parallel, the AMF 211 needs to differentiate the authentication messages for each network slice authentication exchange. For this purpose, the S-NSSAI may be used as differentiation parameter in the NAS messages.

At step 7, after the authentication procedure between the UE 205 and the SP-AAA Server 223 is completed, the SP-AAA Server 223 responds to the Authentication Request with an Authentication Response to the AMF 211, indicating either the success or failure of the authentication. A failure may happen e.g., when the subscription for the service just expired at the service provider. Again, the Authentication Response traverses the same path as in step 5 (e.g., according to Options A, B, or C).

In Option A, the SP-AAA Server 223 responds directly to the AMF 211 by sending an Authentication Response (see messaging 545). This is shown as step 7*a* in the FIG. 5 and is reciprocal to the message in step 5*a*. In Option B, the NEF 219 is involved on the path between NEF 219 and SP-AAA Server 223, therefore the step is depicted as 7*b*-1 (the message 550 from SP-AAA Server 223 to NEF 219) and step 7*b*-2 (the message 555 from NEF 219 to AMF 211). Where the NEF 219 is on the path between AMF 211 and SP-AAA Server 223, the NEF encapsulates the Authentication Response from the SP-AAA Server 223 within a Delivery response message to the AMF 211. The Delivery response message may include at least of AMF ID, transaction ID, target SP-AAA server ID, UE's SUPI and Authentication Response.

At step 8, depending on the result of the authentication, the AMF 211 determines whether to include the S-NSSAO on the Allowed NSSAI (see block 560). In certain embodiments, the AMF 211 may modify the Allowed NSSAI in the following way: If the AAA server indicated authentication failure, then the AMF 211 does not include the associated S-NSSAI in the Allowed NSSAI. If the AAA server indicated authentication success, then the AMF 211 includes the associated S-NSSAI in the Allowed NSSAI. If the UE 205 has been already assigned an Allowed NSSAI and after the network slice authentication procedure the Allowed NSSAI should be changed, the AMF 211 may need to perform a NAS UE Configuration Update procedure in order to remove or to add an S-NSSAI to the Allowed NSSAI.

At step 9, the AMF 211 sends a NAS Registration Accept message including the Allowed NSSAI (see messaging 565). This concludes the second network procedure 500.

Figure 6:
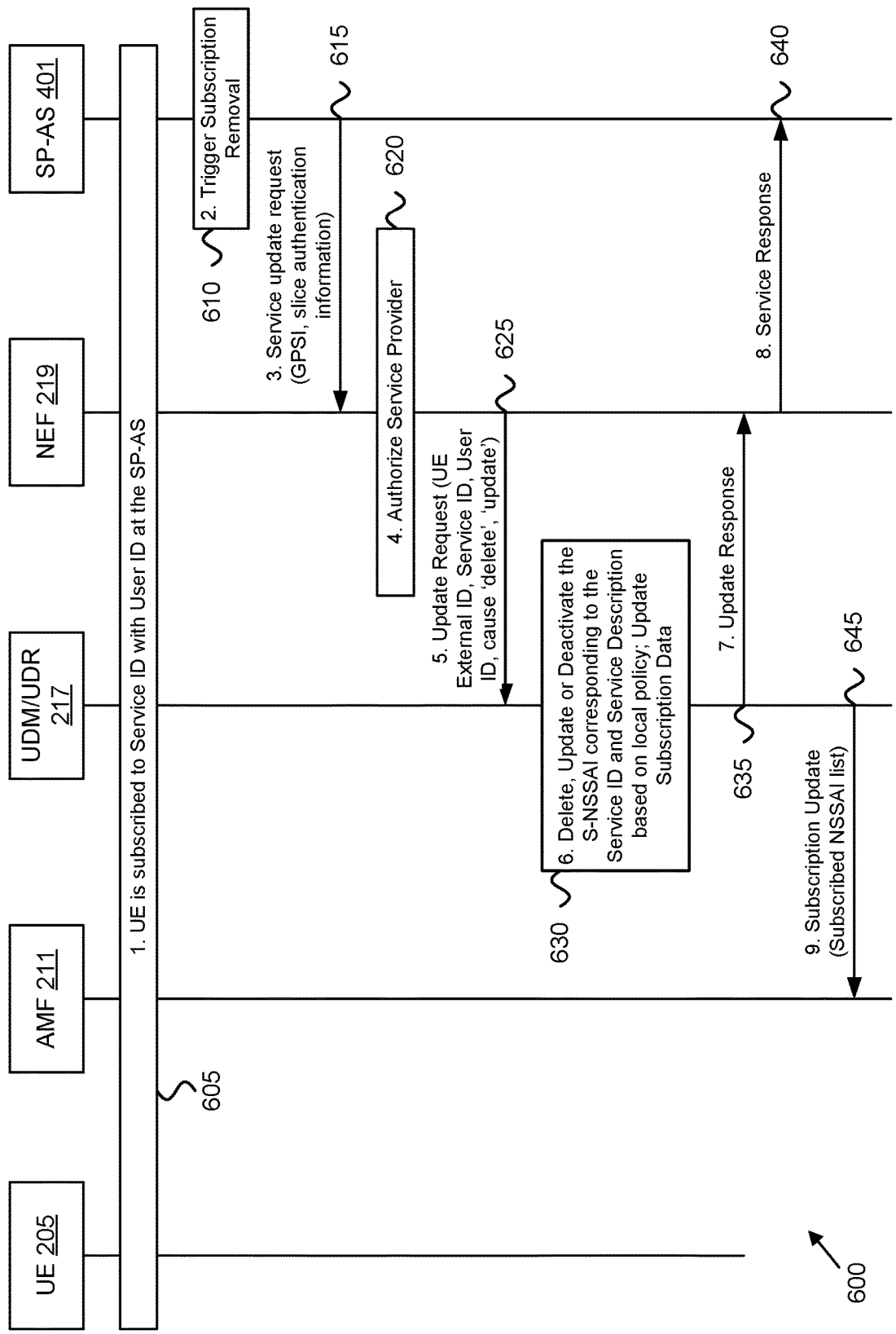
FIG. 6 is a diagram illustrating one embodiment of a network procedure for service provider triggered unsubscription.

FIG. 6 depicts a third network procedure 600 for service provider triggered unsubscription, according to embodiments of the disclosure. The third network procedure 600 involves the UE 205, the AMF 211, the UDM/UDR 217, the NEF 219, and the SP-AS 401. FIG. 6 shows signaling flows for updating the service-related information already provisioned to the network. In the particular use case, the SP-AS 401 triggers the deletion of already provisioned information. A detailed description of the steps in FIG. 6 is provided as follows:

At step 1, the UE 205 is subscribed to a service at the service provider (see block 605), e.g., as described in FIG. 4. At step 2: A trigger for removing the subscription is detected at the service provider (e.g., SP-AS 401, see block 610). This trigger could be e.g., a timeout of the subscription.

At step 3: Based on the UE External ID, the SP-AS 401 sends a Service Request message to the NEF 219 (see messaging 615). The Service Request message contains the service subscription information, e.g., the UE External ID, User ID, Service ID, and the update cause. In various embodiments, the cause can be 'delete' or 'update'. If the cause value is 'update,' then the SP-AS 401 may further indicate that there may be a change whether Authentication is required or not. For example, an additional information element "Auth Req." may be included: if cause='update' then Auth Req.='ON'/'OFF' and in case of 'ON' it may include an additional Re-Authentication Time Interval.

At step 4, the NEF 219 performs authorization of the message from the service provider (see block 620). At step 5, the NEF 219 sends an Update Request to the UDM/UDR 217 (see messaging 625), containing all the relevant information to identify the subscription and the service, i.e., the UE External ID, User ID, Service ID, and the update cause (e.g., 'delete' or 'update').

At step 6, the UDM/UDR 217 identifies based on the UE external ID and/or Service ID the corresponding S-NSSAI used in the network. The UDM/UDR 217 deletes, updates, or deactivates network slice authentication for the relevant S-NSSAI and updates the Subscription Data (see block 630). Alternatively, the UDM/UDR 217 or another network function in the mobile network may delete the Subscribed S-NSSAI corresponding to the Service ID and Service Description based on local policy and the UDM/UDR 217 updates the Subscription Data.

At step 7, the UDM/UDR 217 sends an Update Response to the NEF 219, indicating that the Subscription has been removed, updated, or deactivated (see messaging 635). At step 8, the NEF 219 sends a Service Update Response message to the SP-AS 401 (see messaging 640).

At step 9, the UDM/UDR 217 updates the serving AMF 211 with the new updated subscription data, i.e., the new Subscribed S-NSSAI list with the removed or updated S-NSSAI (see messaging 645). If the cause was 'update' with Auth Req.='ON,' then the UDM/UDR 217 needs to send the relevant slice authentication information to the AMF 211 (updated S-NSSAI associated with Service ID, AAA Server ID, User ID and potentially Re-Authentication Time Interval), similar to a new service subscription as shown in FIG. 4, Step 12.

In order to implement the above described solutions, the following enhancements may be implemented at the following network entities and/or terminal equipment:

The NEF 219 may have the capability to expose provision network slice authentication information to the UDM/UDR 217. The NEF 219 may also have the ability to forward authentication/authorization messages between the AMF 211 and the SP-AAA server 223. The UDM/UDR 217 may have the ability to maintain network slice authentication information associated with an S-NSSAI.

The AMF 211 may have the ability to store network slice authentication information associated with an S-NSSAI. The AMF 211 may have the ability to trigger authentication towards an AAA server (e.g., the SP-AAA Server 223). The AMF 211 may have the ability to encapsulate the authentication messages as payload within N1 MM NAS transport message(s). The AMF 211 may have the ability to determine whether to include S-NSSAI in the allowed NSSAI based on the authentication response from the AAA server.

The UE 205 (terminal command) may be enhanced at the application level to store network slice authentication information, register with NAS layer pointing to the associated S-NSSAI (or alternatively User ID). The UE 205 may forward authentication messages for network slice authentication between the application layer and the NAS layer, e.g., based on the S-NSSAI (or alternatively User ID). The UE 205 may have the ability to encapsulate the authentication messages with a AAA server as payload within NAS protocol messages towards the AMF 211.

Figure 7:
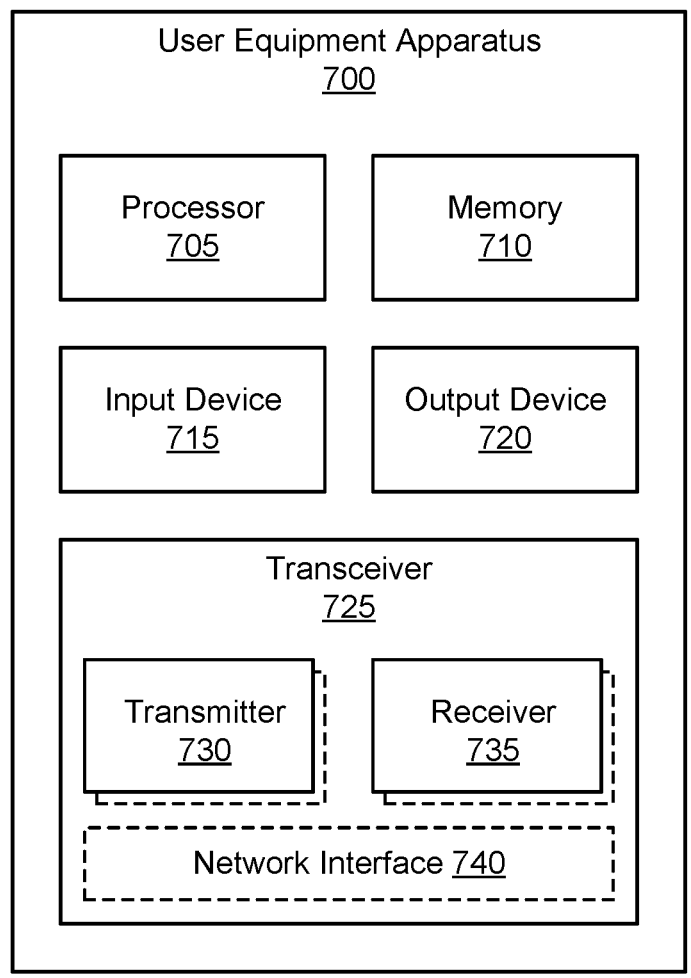
FIG. 7 is a schematic block diagram illustrating one embodiment of a user equipment apparatus that may be used for network slice authentication.

FIG. 7 depicts one embodiment of a user equipment apparatus 700 that may be used for network slice authentication, according to embodiments of the disclosure. The user equipment apparatus 700 may be one embodiment of the remote unit 105. Furthermore, the user equipment apparatus 700 may include a processor 705, a memory 710, an input device 715, an output device 720, a transceiver 725. In some embodiments, the input device 715 and the output device 720 are combined into a single device, such as a touch screen. In certain embodiments, the user equipment apparatus 700 does not include any input device 715 and/or output device 720.

As depicted, the transceiver 725 includes at least one transmitter 730 and at least one receiver 735. Here, the transceiver 725 communicates with a mobile core network (e.g., a 5GC) via an access network, e.g., containing a RAN node. Additionally, the transceiver 725 may support at least one network interface 740. Here, the at least one network interface 740 facilitates communication with an eNB, gNB, or other RAN node (e.g., using the "Uu" interface). Additionally, the at least one network interface 740 may include an interface used for communications with an AMF, such as the "N1" interface.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 provides an application layer and a non-access stratum ("NAS") layer. The processor 705 receives, at an application at the application layer, network slice authentication information for a subscribed service and stores the network slice authentication information at an application module. The processor 705 associates the network slice authentication information with single network slice selection assistance information ("S-NSSAI") and registers the application with the NAS layer, said registration pointing to the associated S-NSSAI. The processor 705 controls the transceiver 725 to exchange, via the NAS layer, authentication messages with an authentication, authorization, and accounting ("AAA") server for network slice authentication information.

In some embodiments, the network slice authentication information includes one or more of: an indication whether authentication is required, a user ID, a service ID, a service description, an AAA server ID, and security credentials. In some embodiments, the processor associates the network slice authentication information with an S-NSSAI based on network slice selection policy ("NSSP") rules. In such embodiments, the NSSP rules map an application from the application layer to an S-NSSAI. In certain embodiments, the NSSP rules are associated with one or more UE route selection policy ("URSP") rules.

In some embodiments, the authentication messages are exchanged via an AMF in a mobile communication network. Here, the authentication messages are encapsulated as payload within NAS protocol messages, wherein the network slice authentication information comprises different credentials than those used to register the user equipment apparatus 700 with the mobile communication network.

In some embodiments, receiving the network slice authentication information may include being provisioned with the network slice authentication information by a mobile communication network. Here, means for provisioning the user equipment apparatus 700 with the network slice authentication information may be defined by the network operator, for example specified by 3GPP. In other embodiments, receiving the network slice authentication information may include receiving credentials for authentication from a service provider (e.g., the provider of the subscribed service). In one embodiment, the service provider is located inside the mobile communication network. In another embodiment, the service provider is located outside the mobile communication network. Here, means for provisioning the user equipment apparatus 700 with the network slice authentication information may not be defined by the network operator, for example not specified by 3GPP.

In some embodiments, exchanging, via the NAS layer, authentication messages with the AAA server comprises the NAS layer receiving an authentication request for the associated S-NSSAI and forwarding authentication messages to the registered application. In such embodiments, the authentication request includes the associated S-NSSAI in a NAS header. In certain embodiments, the authentication request includes a user ID of the subscribed service, wherein the network slice authentication information contains the user ID, wherein the registered application generates an authentication response based on the user ID and the stored network slice authentication information.

In some embodiments, the transceiver 725 further sends a registration request to a mobile communication network, the registration request including the associated S-NSSAI, wherein exchanging authentication messages with the AAA server is triggered by the registration request. In some embodiments, the registration in the NAS layer corresponding to the application indicates that security information is stored at the application module.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to network slice authentication, for example storing a network slice authentication information, NSSP rules, application registrations, and the like. In certain embodiments, the memory 710 also stores program code and related data, such as an operating system ("OS") or other controller algorithms operating on the user equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

In various embodiments, the transceiver 725 includes at least one transmitter 730 and at least one receiver 735. One or more transmitters 730 may be used to provide UL communication signals to a base unit 110, such as the AUL transmissions described herein. Similarly, one or more receivers 735 may be used to receive DL communication signals from the base unit 110, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an application specific integrated circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
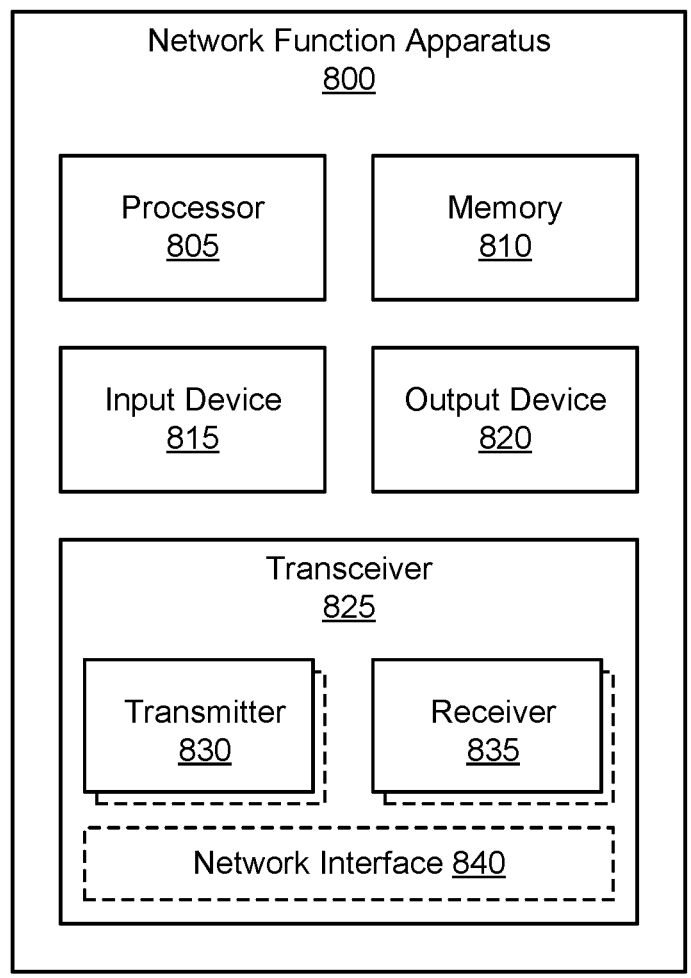
FIG. 8 is a schematic block diagram illustrating one embodiment of a network function apparatus that may be used for network slice authentication.

FIG. 8 depicts one embodiment of a network equipment apparatus 800 that may be used for network slice authentication, according to embodiments of the disclosure. The network equipment apparatus 800 may be one embodiment of the AMF 211, UDM/UDR 217, NEF 219, AS/AF 221, and/or SP-AAA 223, described above. Furthermore, the network equipment apparatus 800 may include a processor 805, a memory 810, an input device 815, an output device 820, and a transceiver 825. In some embodiments, the input device 815 and the output device 820 are combined into a single device, such as a touchscreen. In certain embodiments, the network equipment apparatus 800 may not include any input device 815 and/or output device 820. In various embodiments, the network equipment apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

Where the network equipment apparatus 800 is an application server, the processor 805 may implement any of the above described AS/AF behaviors. Specifically, the processor 805 may provision network slice authentication information to a mobile network. Here, the processor 805 may use an expose network service (e.g., an API) to provision the network slice authentication information. In various embodiments, the network slice authentication information includes at least one of: an indication whether network slice authentication is required, a User ID, a service ID and/or service description, and a AAA server ID. Via the expose network service, the processor 805 may provision a UDM/UDR, such that the network slice authentication information is stored in the UDM/UDR and is associated with a particular S-NSSAI.

Where the network equipment apparatus 800 is an AMF, the processor 805 may implement any of the above described AMF behaviors. Specifically, the processor 805 may send the network slice authentication information associated with an S-NSSAI is part of subscription data. Moreover, the processor 805 may determine whether network slice authentication is required for one or more of the NSSAIs requested by a terminal (e.g., UE). In some embodiments, if the network slice authentication (or authorization) is required or the S-NSSAI, the processor 805 controls the transceiver 825 to send an authentication request to a AAA server based on the network slice authentication information. Moreover, the processor 805 encapsulates the authentication messages between the terminal (e.g., UE) and the AAA server as payload within NAS protocol messages.

Additionally, the processor 805 may determine whether to include the associated S-NSSAI in the allowed NSSAI to be sent to the terminal (e.g., UE) based on the success or failure of the network slice authentication exchange.

Where the network equipment apparatus 800 is a UDM, the processor 805 may implement any of the above described UDM/UDR behaviors. Specifically, the processor 805 may perform binding of the UE subscription to the User IDs as well as the subscribed service with information about the service provider. Additionally, the processor may store network slice authentication information and control the transceiver 825 to signal the network slice authentication information to a serving AMF together with the UE subscription data.

In some embodiments, the processor 805 may receive an update request from an NEF and map the update request from the NEF to a particular UE subscription data. Based on the update request from the NEF, the processor 805 may also add a new S-NSSAI to the Subscribed S-NSSAIs in the subscription data. In certain embodiments, the processor 805 may identify, based on the UE external ID and/or Service ID, the corresponding S-NSSAI used in the network. In some embodiments, the processor 805 may delete, update, or deactivate network slice authentication for the relevant S-NSSAI based on the update request. In response to an update to UE subscription data, the processor 805 may control the transceiver 825 to update the serving AMF, as described above with reference to FIGS. 4 and 6.

In various embodiments, the transceiver 825 receives a first request containing subscription and service information. The processor 805 then identifies a network slice in a mobile communication system based on the subscription and service information. The processor 805 updates authentication for the network slice based on the first request and controls the transceiver 825 to send updated subscription data to an AMF.

In some embodiments, the first request comprises an update cause and one or more of UE External ID, User ID, and Service ID. In some embodiments, the processor 805 further maps the first request to a particular UE subscription data using the subscription and service information and updating the UE subscription data based on the first request, wherein the transceiver 825 sends the updated UE subscription data.

In certain embodiments, the network slice is identified by a S-NSSAI. In various embodiments, the subscription data comprises a list of subscribed S-NSSAI. In one embodiment, updating authentication for the network slice comprises adding a new S-NSSAI to the list of subscribed S-NSSAI. In another embodiment, updating authentication for the network slice comprises deleting an existing S-NSSAI to the list of subscribed S-NSSAI.

In certain embodiments, the processor 805 stores network slice authentication information, wherein the network slice authentication information includes one or more of: an indication whether authentication is required, a user ID, a service ID, a service description, and an AAA server ID.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media. In some embodiments, the memory 810 stores data related to network slice authentication. For example, the memory 810 may store UE subscription data, network slice authentication information, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages. The transceiver 825 includes at least transmitter 830 and at least one receiver 835. One or more transmitters 830 may be used to send messages to a UE, AAA server, or NF, as described herein. Similarly, one or more receivers 835 may be used to receive messages to a UE, AAA server, or NF, as described herein. Additionally, the transceiver 825 may support at least one network interface 840. For example, the network interface may be an interface between network functions as depicted in FIG. 2A (e.g., N1, N4, N6, N33, Namf, Nsmf, Nudm, Nnef, etc).

Although only one transmitter 830 and one receiver 835 are illustrated, the network function apparatus 800 may have any suitable number of transmitters 830 and receivers 835. Further, the transmitter(s) 830 and the receiver(s) 835 may be any suitable type of transmitters and receivers. In certain embodiments, the transmitter(s) 830 and receiver(s) 835 may be combined into a single transceiver unit, for example a single chip performing functions for use with both licensed and unlicensed radio spectrum. In some embodiments, the transmitter(s) 830 and receiver(s) 835 may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an application specific integrated circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
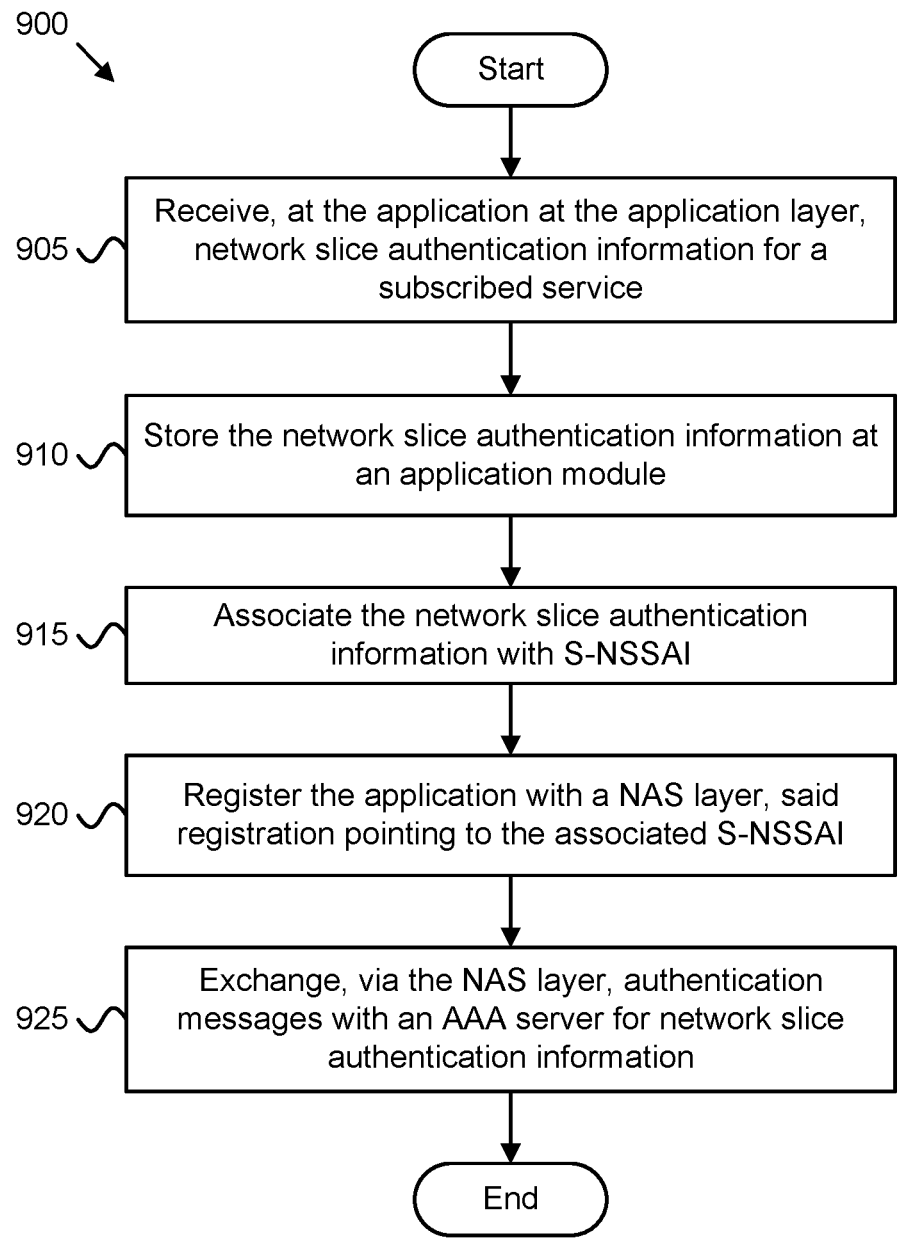
FIG. 9 is a flowchart diagram illustrating one embodiment of a method for network slice authentication.

FIG. 9 depicts a method 900 for network slice authentication, according to embodiments of the disclosure. In some embodiments, the method 900 is performed by an apparatus, such as the remote unit 105, the UE 205, and/or the user equipment apparatus 700. In certain embodiments, the method 900 may be performed by a processor executing program code, for example, a microcontroller, a microprocessor, a CPU, a GPU, an auxiliary processing unit, a FPGA, or the like.

The method 900 begins and receives 905, at the application at the application layer, network slice authentication information for a subscribed service. The method 900 includes storing 910 the network slice authentication information at an application module. The method 900 includes associating 915 the network slice authentication information with single network slice selection assistance information ("S-NSSAI"). The method 900 includes registering 920 the application with the non-access stratum ("NAS") layer, said registration pointing to the associated S-NSSAI. The method 900 includes exchanging 925, via the NAS layer, authentication messages with an authentication, authorization, and accounting ("AAA") server for network slice authentication information. The method 900 ends.

Figure 10:
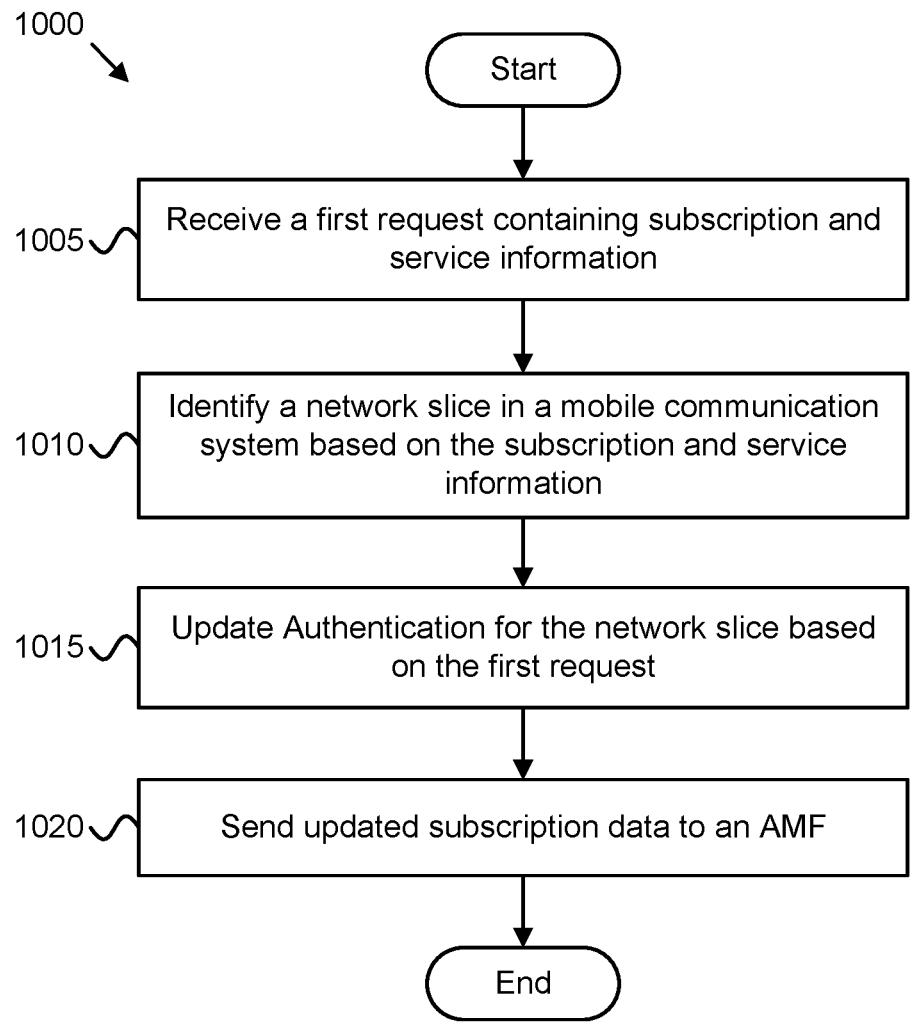
FIG. 10 is a flowchart diagram illustrating another embodiment of a method for network slice authentication.

FIG. 10 depicts a method 1000 for network slice authentication, according to embodiments of the disclosure. In some embodiments, the method 1000 is performed by a network apparatus, such as the UDM/UDR 142, the UDM/UDR 217 and/or the network function apparatus 800. In certain embodiments, the method 1000 may be performed by a processor executing program code, for example, a microcontroller, a microprocessor, a CPU, a GPU, an auxiliary processing unit, a FPGA, or the like.

The method 1000 begins and receives 1005 a first request containing subscription and service information. The method 1000 includes identifying 1010 a network slice in a mobile communication system based on the subscription and service information. The method 1000 includes updating 1015 authentication for the network slice based on the first request. The method 1000 includes sending 1020 updated subscription data to an AMF. The method 1000 ends.

Disclosed herein is a first apparatus for network slice authentication. The first apparatus may be implemented by a UE, such as the remote unit 105, the UE 205, and/or the user equipment apparatus 700. The first apparatus includes a processor that provides an application layer and a non-access stratum ("NAS") layer. The processor receives, at an application at the application layer, network slice authentication information for a subscribed service and stores the network slice authentication information at an application module. The processor associates the network slice authentication information with single network slice selection assistance information ("S-NSSAI") and registers the application with the NAS layer, said registration pointing to the associated S-NSSAI. The apparatus includes a transceiver that exchanges, via the NAS layer, authentication messages with an authentication, authorization, and accounting ("AAA") server for network slice authentication information.

In some embodiments, the network slice authentication information includes one or more of: an indication whether authentication is required, a user ID, a service ID, a service description, an AAA server ID, and security credentials. In some embodiments, the authentication messages are exchanged via an Access and Mobility Management Function ("AMF") in a mobile communication network, the authentication messages with the AAA server are encapsulated as payload within NAS protocol messages, and the network slice authentication information comprises different credentials than those used to authenticate the apparatus with the mobile communication network.

In some embodiments, associating the network slice authentication information with an S-NSSAI is based on network slice selection policy ("NSSP") rules. In such embodiments, the NSSP rules map an application from the application layer to an S-NSSAI. In certain embodiments, the NSSP rules are associated with one or more UE route selection policy ("URSP") rules. In some embodiments, receiving the network slice authentication information comprises one of: being provisioned with the network slice authentication information by a mobile communication network and receiving credentials for authentication from a service provider located inside or outside the mobile communication network.

In some embodiments, exchanging, via the NAS layer, authentication messages with the AAA server comprises the NAS layer receiving an authentication request for the associated S-NSSAI and forwarding authentication messages to the registered application. In such embodiments, the authentication request includes the associated S-NSSAI in a NAS header. In certain embodiments, the authentication request includes a user ID of the subscribed service, wherein the network slice authentication information contains the user ID, wherein the registered application generates an authentication response based on the user ID and the stored network slice authentication information.

In some embodiments, the transceiver further sends a registration request to a mobile communication network, the registration request including the associated S-NSSAI, wherein exchanging authentication messages with the AAA server is triggered by the registration request. In some embodiments, the registration in the NAS layer corresponding to the application indicates that security information is stored at the application module.

Disclosed herein is a first method for network slice authentication. The first method may be performed by a UE, such as the remote unit 105, the UE 205, and/or the user equipment apparatus 700. The first method includes receiving, at the application at the application layer, network slice authentication information for a subscribed service and storing the network slice authentication information at an application module. The first method includes associating the network slice authentication information with single network slice selection assistance information ("S-NSSAI") and registering the application with the non-access stratum ("NAS") layer, said registration pointing to the associated S-NSSAI. The first method includes exchanging, via the NAS layer, authentication messages with an authentication, authorization, and accounting ("AAA") server for network slice authentication information.

In some embodiments, the network slice authentication information includes one or more of: an indication whether authentication is required, a user ID, a service ID, a service description, an AAA server ID, and security credentials. In some embodiments, the authentication messages are exchanged via an Access and Mobility Management Function ("AMF") in a mobile communication network, the authentication messages with the AAA server are encapsulated as payload within NAS protocol messages, and the network slice authentication information comprises different credentials than those used to authenticate the apparatus with the mobile communication network.

In some embodiments, associating the network slice authentication information with an S-NSSAI is based on network slice selection policy ("NSSP") rules. In such embodiments, the NSSP rules maps an application from the application layer to an S-NSSAI. In certain embodiments, the NSSP rules are associated with one or more UE route selection policy ("URSP") rules. In some embodiments, receiving the network slice authentication information comprises one of: being provisioned with the network slice authentication information by a mobile communication network and receiving credentials for authentication from a service provider located inside or outside the mobile communication network.

In various embodiments, exchanging, via the NAS layer, authentication messages with the AAA server comprises the NAS layer receiving an authentication request for the associated S-NSSAI and forwarding authentication messages to the registered application. In such embodiments, the authentication request includes the associated S-NSSAI in a NAS header. In certain embodiments, the authentication request includes a user ID of the subscribed service, wherein the network slice authentication information contains the user ID. Here, the first method further includes the registered application generating an authentication response based on the user ID and the stored network slice authentication information.

In some embodiments, the method includes sending a registration request to a mobile communication network, the registration request including the associated S-NSSAI. In such embodiments, exchanging authentication messages with the AAA server is triggered by the registration request. In some embodiments, the registration in the NAS layer corresponding to the application indicates that security information is stored at the application module.

Disclosed herein is a second apparatus for network slice authentication. The second apparatus may be implemented by a data management function, such as the UDM/UDR 142, the UDM/UDR 217 and/or the network function apparatus 800. The second apparatus includes a transceiver that receives a first request containing subscription and service information. The second apparatus also includes a processor that identifies a network slice in a mobile communication system based on the subscription and service information. The processor updates authentication for the network slice based on the first request, wherein the transceiver sends updated subscription data to an AMF In some embodiments, the first request comprises an update cause and one or more of UE External ID, User ID, and Service ID. In some embodiments, the processor further maps the first request to a particular UE subscription data using the subscription and service information and updating the UE subscription data based on the first request, wherein sending updated subscription data to comprises sending the updated UE subscription data.

In certain embodiments, the network slice is identified by a S-NSSAI. In various embodiments, the subscription data comprises a list of subscribed S-NSSAI. In one embodiment, updating authentication for the network slice comprises adding a new S-NSSAI to the list of subscribed S-NSSAI. In another embodiment, updating authentication for the network slice comprises deleting an existing S-NSSAI to the list of subscribed S-NSSAI.

In certain embodiments, the processor stores the network slice authentication information, wherein the network slice authentication information includes one or more of: an indication whether authentication is required, a user ID, a service ID, a service description, and an AAA server ID.

Disclosed herein is a second method for network slice authentication. The second method may be performed by a data management function, such as the UDM/UDR 142, the UDM/UDR 217 and/or the network function apparatus 800. The second method includes receiving a first request containing subscription and service information. The second method includes identifying a network slice in a mobile communication system based on the subscription and service information. The second method includes updating authentication for the network slice based on the first request. The second method includes sending updated subscription data to an AMF.

In some embodiments, the first request comprises an update cause and one or more of UE External ID, User ID, and Service ID. In some embodiments, the second method further includes mapping the first request to a particular UE subscription data using the subscription and service information and updating the UE subscription data based on the first request, wherein sending updated subscription data to comprises sending the updated UE subscription data.

In certain embodiments, the network slice is identified by a S-NSSAI. In various embodiments, the subscription data comprises a list of subscribed S-NSSAI. In one embodiment, updating authentication for the network slice comprises adding a new S-NSSAI to the list of subscribed S-NSSAI. In another embodiment, updating authentication for the network slice comprises deleting an existing S-NSSAI to the list of subscribed S-NSSAI.

In certain embodiments, the second method includes the storing network slice authentication information, wherein the network slice authentication information includes one or more of: an indication whether authentication is required, a user ID, a service ID, a service description, and an AAA server ID.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor that provides an application layer and a non-access stratum ("NAS") layer, wherein the processor further:
   receives, at an application at the application layer, network slice authentication information for a subscribed service;
   stores the network slice authentication information at an application module;
   associates the network slice authentication information with single network slice selection assistance information ("S-NSSAI"); and
   registers the application with the NAS layer, wherein an application registration points to the associated S-NSSAI; and
   a transceiver that exchanges, via the NAS layer, authentication messages with an authentication, authorization, and accounting ("AAA") server for the network slice authentication information.

2. The apparatus of claim 1, wherein the network slice authentication information includes one or more of: an indication whether authentication is required, a user ID, a service ID, a service description, an AAA server ID, and security credentials.

3. The apparatus of claim 1, wherein the authentication messages are exchanged via an Access and Mobility Management Function ("AMF") in a mobile communication network, wherein the authentication messages with the AAA server are encapsulated as payload within NAS protocol messages, and wherein the network slice authentication information comprises different credentials than those used to authenticate the apparatus with the mobile communication network.

4. The apparatus of claim 1, wherein associating the network slice authentication information with an S-NSSAI is based on network slice selection policy ("NSSP") rules, wherein the NSSP rules map an application from the application layer to an S-NSSAI.

5. The apparatus of claim 4, wherein the NSSP rules are associated with one or more UE route selection policy ("URSP") rules.

6. The apparatus of claim 1, wherein receiving the network slice authentication information comprises one of: being provisioned with the network slice authentication information by a mobile communication network and receiving credentials for authentication from a service provider is located inside the mobile communication network or located outside the mobile communication network.

7. The apparatus of claim 1, wherein exchanging, via the NAS layer, authentication messages with the AAA server comprises the NAS layer receiving an authentication request for the associated S-NSSAI and forwarding authentication messages to the registered application.

8. The apparatus of claim 7, wherein the authentication request includes the associated S-NSSAI in a NAS header.

9. The apparatus of claim 7, wherein the authentication request includes a user ID of the subscribed service, wherein the network slice authentication information contains the user ID, wherein the registered application generates an authentication response based on the user ID and the stored network slice authentication information.

10. The apparatus of claim 1, wherein the transceiver further sends a registration request to a mobile communication network, the registration request including the associated S-NSSAI, wherein exchanging authentication messages with the AAA server is triggered by the registration request.

11. The apparatus of claim 1, wherein the registration in the NAS layer corresponding to the application indicates that security information is stored at the application module.

12. A method performed by a user equipment ("UE"), the method comprising:
    receiving, at an application at an application layer, network slice authentication information for a subscribed service;
    storing the network slice authentication information at an application module;
    associating the network slice authentication information with single network slice selection assistance information ("S-NSSAI");
    registering the application with a non-access stratum ("NAS") layer, wherein an application registration points to the associated S-NSSAI; and
    exchanging, via the NAS layer, authentication messages with an authentication, authorization, and accounting ("AAA") server for the network slice authentication information.

13. The method of claim 12, wherein the network slice authentication information includes one or more of: an indication whether authentication is required, a user ID, a service ID, a service description, an AAA server ID, and security credentials.

14. The method of claim 12, wherein the authentication messages are exchanged via an Access and Mobility Management Function ("AMF") in a mobile communication network, wherein the authentication messages with the AAA server are encapsulated as payload within NAS protocol messages, and wherein the network slice authentication information comprises different credentials than those used to authenticate the UE with the mobile communication network.

15. The method of claim 12, wherein associating the network slice authentication information with an S-NSSAI is based on network slice selection policy ("NSSP") rules, wherein the NSSP rules map an application from the application layer to an S-NSSAI.

16. The method of claim 15, wherein the NSSP rules are associated with one or more UE route selection policy ("URSP") rules.

17. The method of claim 12, wherein receiving the network slice authentication information comprises one of: being provisioned with the network slice authentication information by a mobile communication network and receiving credentials for authentication from a service provider, wherein the service provider is located inside the mobile communication network or located outside the mobile communication network.

18. The method of claim 12, wherein exchanging, via the NAS layer, authentication messages with the AAA server comprises the NAS layer receiving an authentication request for the associated S-NSSAI and forwarding authentication messages to the registered application.

19. The method of claim 18, wherein the authentication request includes the associated S-NSSAI in a NAS header.

20. The method of claim 18, wherein the authentication request includes a user ID of the subscribed service, wherein the network slice authentication information contains the user ID, the method further comprising the registered application generating an authentication response based on the user ID and the stored network slice authentication information.

21. The method of claim 12, further comprising sending a registration request to a mobile communication network, the registration request including the associated S-NSSAI, wherein exchanging authentication messages with the AAA server occurs is triggered by the registration request.

22. The method of claim 12, wherein the registration in the NAS layer corresponding to the application indicates that security information is stored at the application module.

* * * * *